(12) United States Patent
Kii et al.

(10) Patent No.: US 7,174,350 B2
(45) Date of Patent: Feb. 6, 2007

(54) DATA EDITION METHOD AND DATA EDITION DEVICE

(75) Inventors: Manabu Kii, Tokyo (JP); Takashi Kawakami, Tokyo (JP); Seiji Ohbi, Tokyo (JP); Toshiya Kaihoko, Tokyo (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 10/500,864

(22) PCT Filed: Dec. 4, 2003

(86) PCT No.: PCT/JP03/15533

§ 371 (c)(1),
(2), (4) Date: Jul. 21, 2004

(87) PCT Pub. No.: WO2004/053876

PCT Pub. Date: Jun. 24, 2004

(65) Prior Publication Data

US 2005/0091442 A1    Apr. 28, 2005

(30) Foreign Application Priority Data

Dec. 9, 2002    (JP) ................ 2002-357159

(51) Int. Cl.
*G06F 12/00* (2006.01)
*G06F 17/30* (2006.01)

(52) U.S. Cl. ................ 707/200; 707/100; 369/30.1; 369/83

(58) Field of Classification Search .............. 707/1, 707/10, 100, 101, 102, 200, 205; 369/30.03, 369/30.05, 83, 85, 106, 30.01; 711/100, 711/200

See application file for complete search history.

(56) References Cited

U.S. PATENT DOCUMENTS

| 4,775,969 | A | * | 10/1988 | Osterlund | ................ | 369/53.1 |
| 5,303,218 | A | * | 4/1994 | Miyake | ................ | 369/47.2 |
| 5,592,450 | A | * | 1/1997 | Yonemitsu et al. | ........... | 386/96 |
| 5,844,911 | A | * | 12/1998 | Schadegg et al. | ........... | 714/710 |
| 5,889,747 | A | * | 3/1999 | Hisamatsu et al. | ...... | 369/47.14 |
| 6,182,088 | B1 | * | 1/2001 | Kawakami et al. | ......... | 707/205 |

(Continued)

FOREIGN PATENT DOCUMENTS

JP    2000-268539    9/2000

(Continued)

*Primary Examiner*—Leslie Wong
*Assistant Examiner*—Susan Rayyan
(74) *Attorney, Agent, or Firm*—Oblon, Spivak, McClelland, Maier & Neustadt, P.C.

(57) ABSTRACT

A data editing method by which reduction of the burden of an editing process regarding stream data recorded on a recording medium is anticipated and a higher speed editing operation can be achieved. Stream data recorded on a recording medium are presupposed to be managed as a file by a file system. The stream data are managed in a unit of a track by a track managing data file managed by the file system. Editing of division or erasure in a unit of a track is executed by rewriting contents of track management information which defines each track in the track managing data file. With the configuration, when a division or erasure editing process in a unit of a track is performed, there is no necessity to rewrite the file system.

6 Claims, 22 Drawing Sheets

U.S. PATENT DOCUMENTS

| | | | |
|---|---|---|---|
| 6,278,678 B1* | 8/2001 | Iida | 369/83 |
| 6,434,103 B1* | 8/2002 | Shitara et al. | 369/83 |
| 6,779,081 B2* | 8/2004 | Arakawa et al. | 711/112 |
| 6,915,377 B2* | 7/2005 | Hitotsui | 711/112 |
| 6,985,584 B1* | 1/2006 | Yokota et al. | 380/200 |
| 7,027,384 B2* | 4/2006 | Ohbi et al. | 369/275.3 |
| 7,031,238 B2* | 4/2006 | Kudo et al. | 369/47.12 |
| 2001/0011267 A1* | 8/2001 | Kihara et al. | 707/1 |
| 2002/0087303 A1* | 7/2002 | Sugiyama | 704/201 |
| 2002/0129200 A1* | 9/2002 | Arakawa et al. | 711/112 |
| 2003/0031319 A1* | 2/2003 | Abe et al. | 380/232 |
| 2003/0182297 A1* | 9/2003 | Murakami et al. | 707/100 |
| 2005/0157601 A1* | 7/2005 | Hitotsui | 369/30.05 |

FOREIGN PATENT DOCUMENTS

JP    2002-204425    7/2002

\* cited by examiner

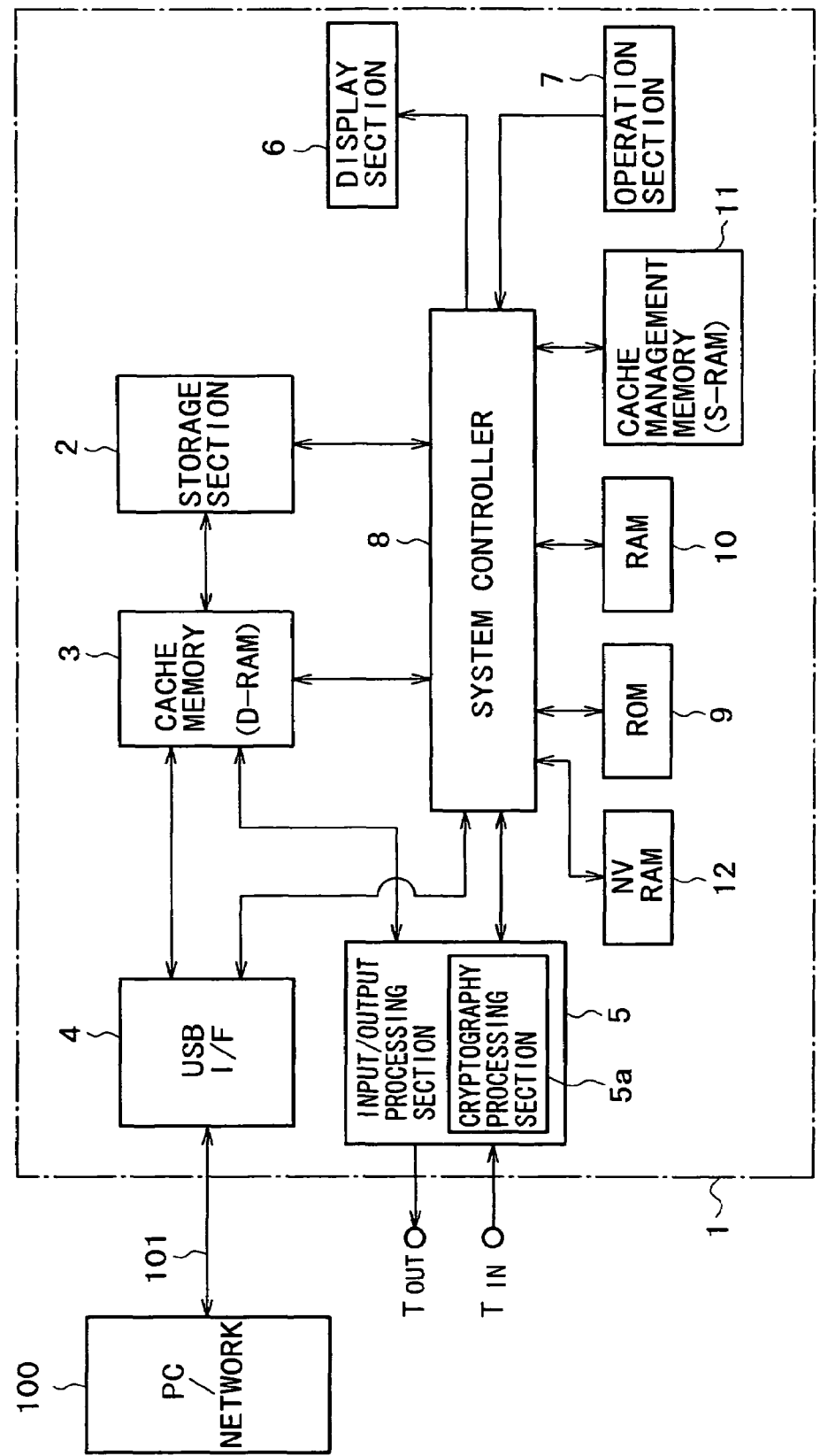

F I G. 2 A

|  | MINI DISK MD (DATA) |
|---|---|
| TRACK PITCH | 1.6 μm |
| BIT LENGTH | 0.59 μm/bit |
| λ · NA | 780nm · 0.45 |
| RECORDING METHOD | GROOVE RECORDING |
| ADDRESS METHOD | SINGLE SPIRAL DOUBLE-SIDED WOBBLE |
| MODULATION METHOD | EFM |
| ERROR CORRECTION METHOD | ACIRC |
| INTERLEAVE | CONVOLUTION |
| REDUNDANCY | 46.3% |
| DETECTION METHOD | BIT-BY-BIT |
| LINEAR VELOCITY | 1.2m/s |
| DATA RATE | 133KB/s |
| TOTAL CAPACITY | 164MB (140MB) |
| MINIMUM REWRITING UNIT | 32 SECTORS +4 LINK SECTORS |

F I G. 2 B

|  | HIGH DENSITY DISK (1) | HIGH DENSITY DISK (2) |
|---|---|---|
| TRACK PITCH | 1.5~1.6 μm | 1.25 μm |
| LINE DENSITY | 0.437 μm/bit | 0.16 μm/bit |
| CAPACITY | 300MB | 1GB |
| TRANSFER RATE | 4.37Mbps | 9.83Mbps |
| LINEAR VELOCITY | 2.4m/sec | 1.98m/sec |

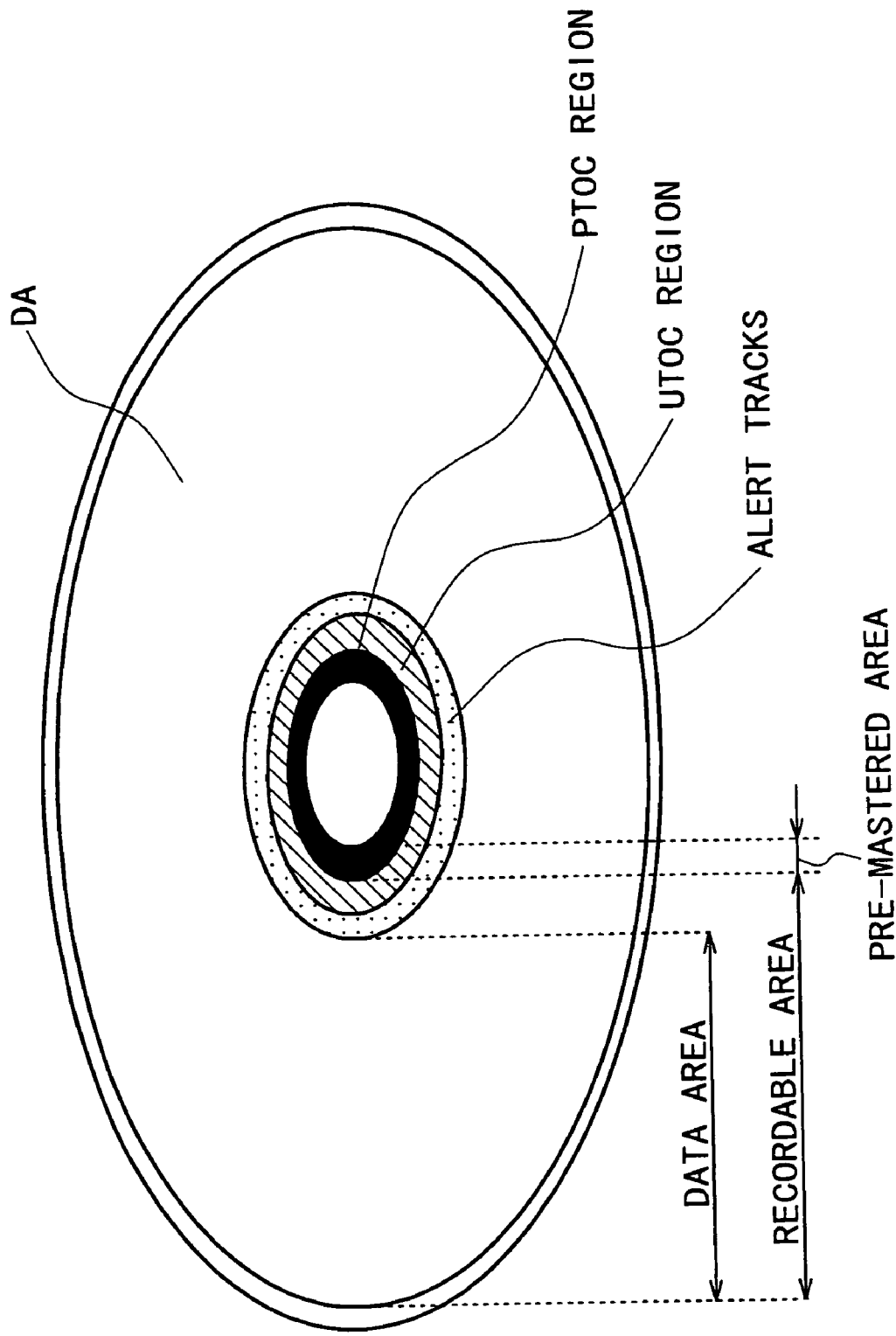

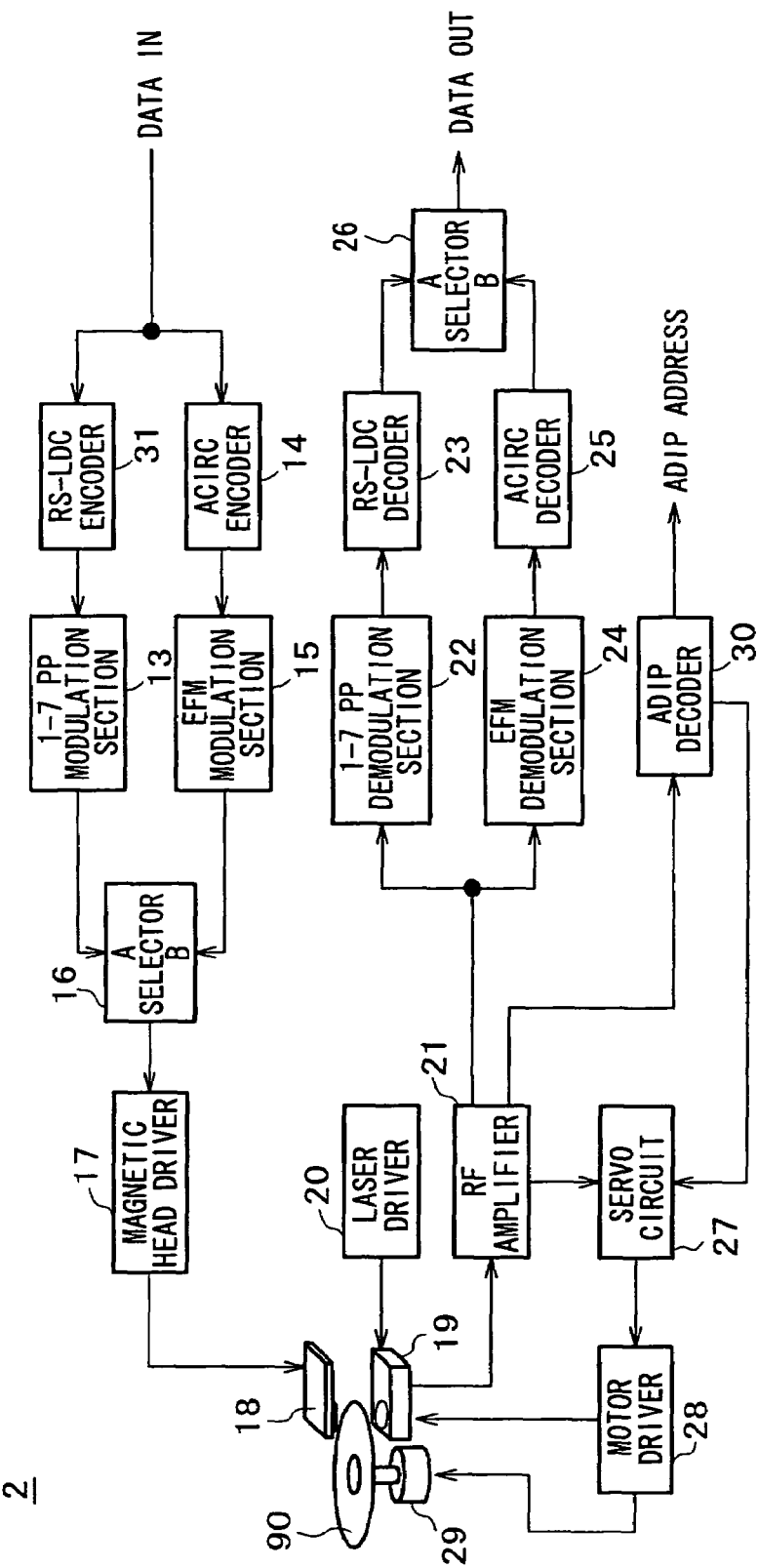

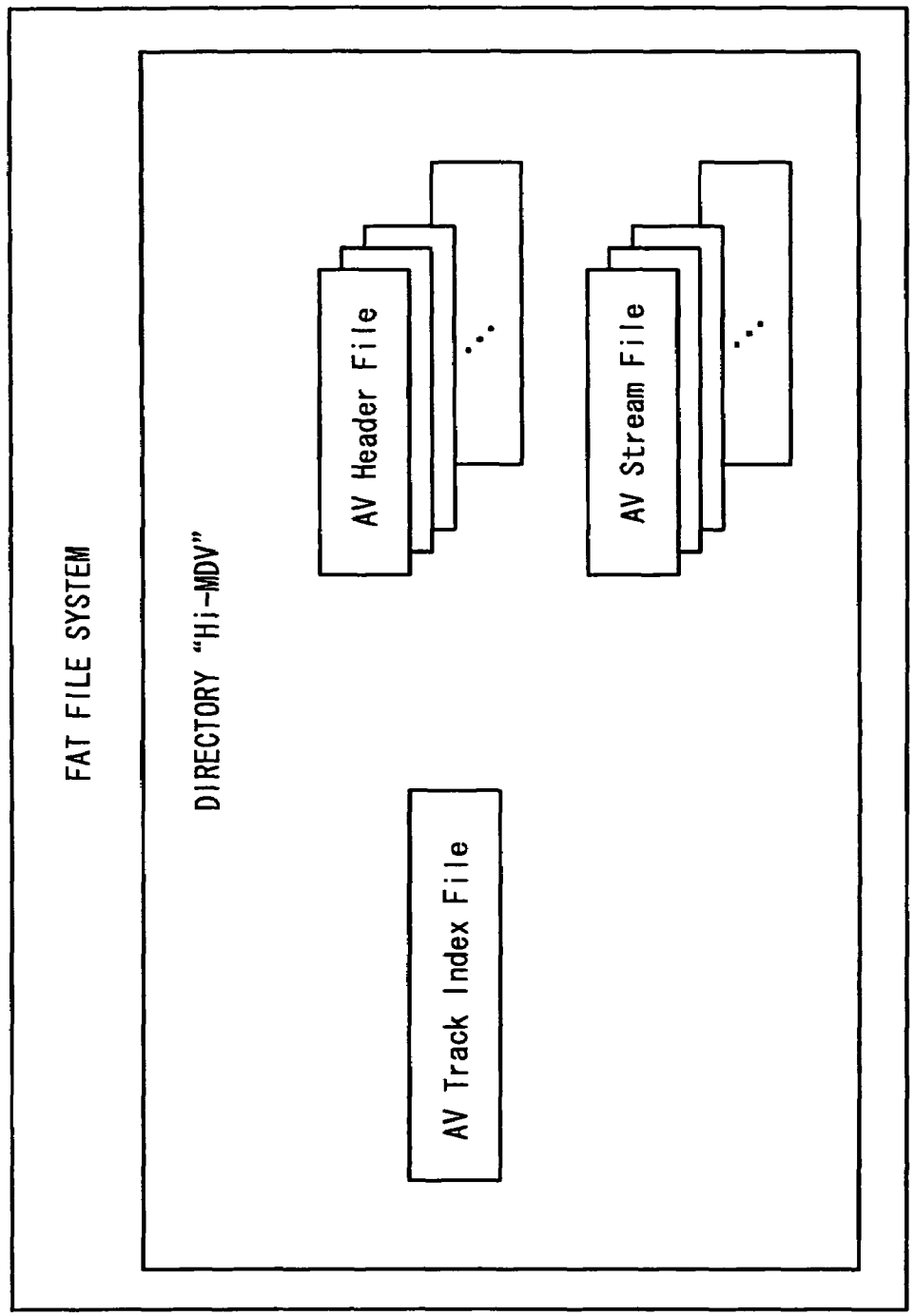

AV Stream File

AV Header File

FIG. 9
(a)
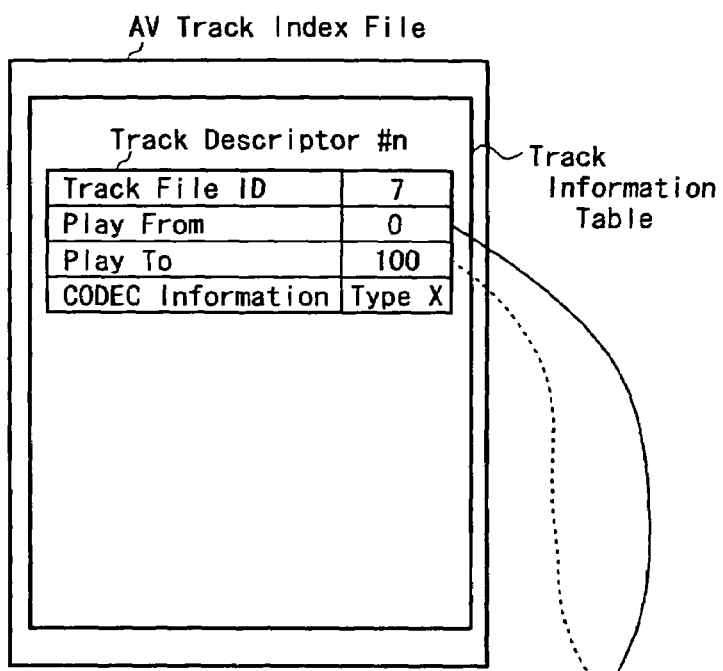
AV Track Index File
Track Descriptor #n
| Track File ID | 7 |
| Play From | 0 |
| Play To | 100 |
| CODEC Information | Type X |
Track Information Table
(b)
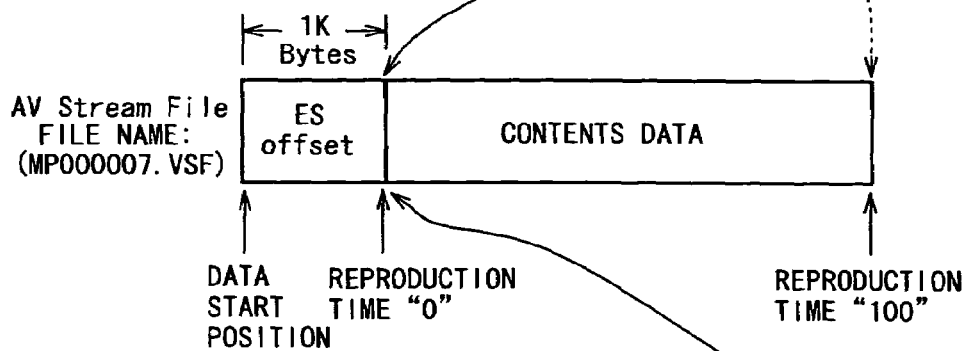
AV Stream File
FILE NAME:
(MP000007.VSF)
|← 1K Bytes →|
ES offset | CONTENTS DATA
DATA START POSITION
REPRODUCTION TIME "0"
REPRODUCTION TIME "100"
(c)
AV Header File
FILE NAME:
(MP000007.VHF)
| ES Offset Size | 1000 |
| Reference Counter | 1 |
| Erase Flag | 0 |
| Total Play Time | 100 |

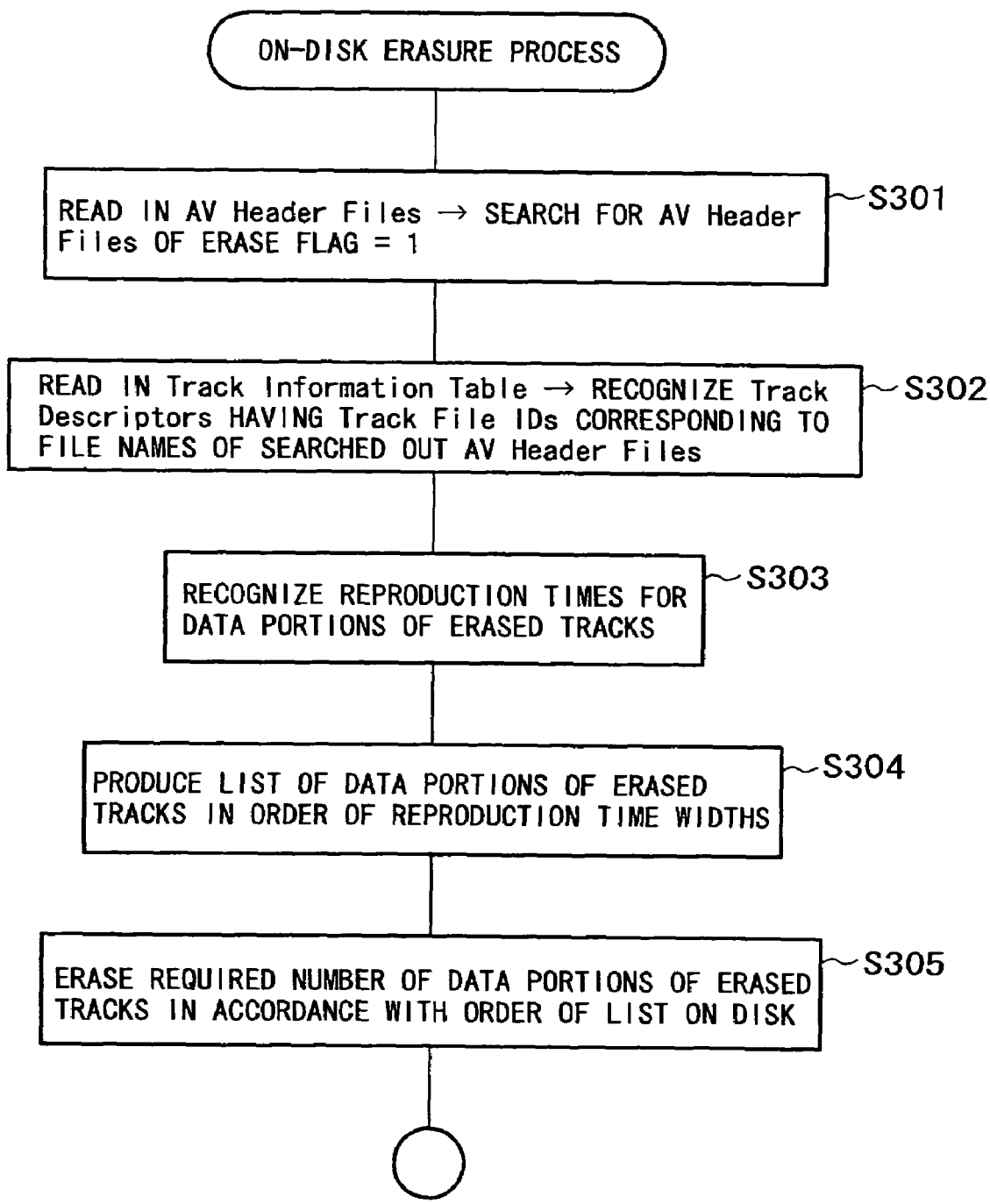

AV Stream File
ID=0

AV Stream File
ID=1

AV Stream File
ID=2

FIG. 19

| ORDER IN LIST | DATA PORTION OF ERASED TRACK | REPRODUCTION TIME WIDTH |
|---|---|---|
| 1 | ID=0<br>Play From/Play To =150/400 | 250 |
| 2 | ID=1<br>Play From/Play To =250/400 | 150 |
| 3 | ID=2<br>Play From/Play To =200/300 | 100 |
| 4 | ID=2<br>Play From/Play To =500/550 | 50 |

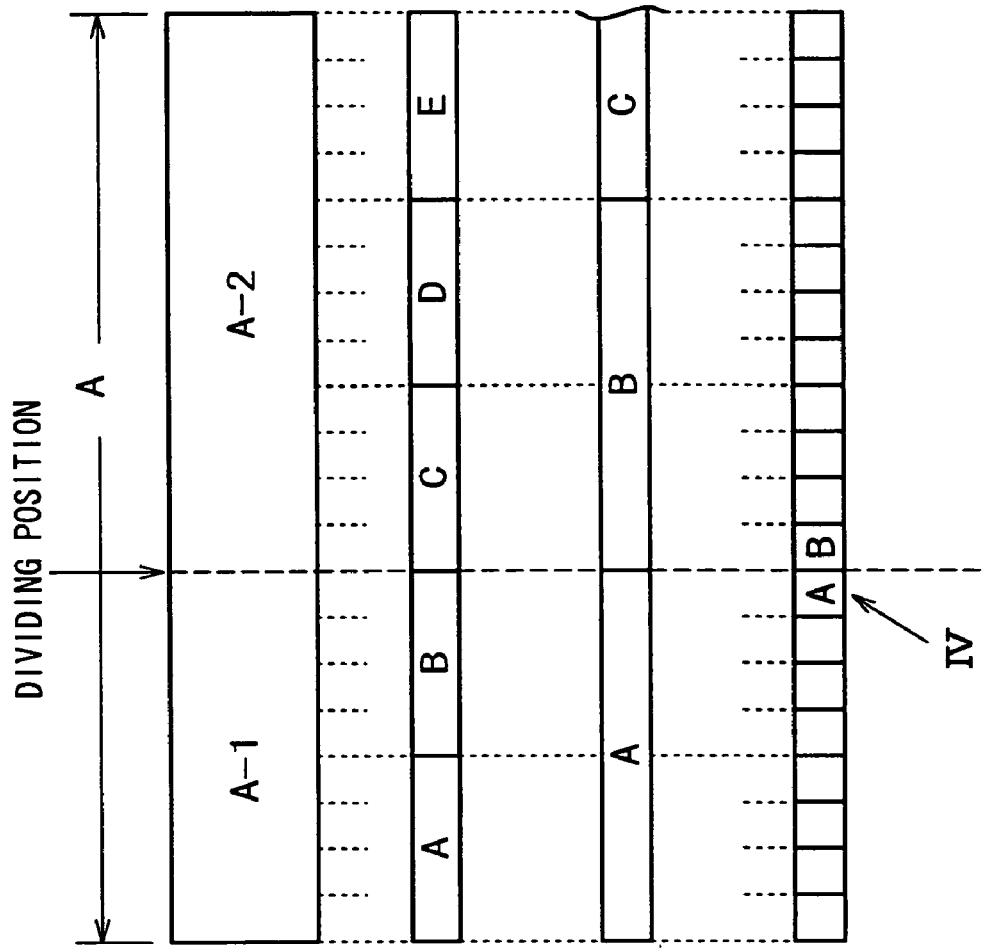

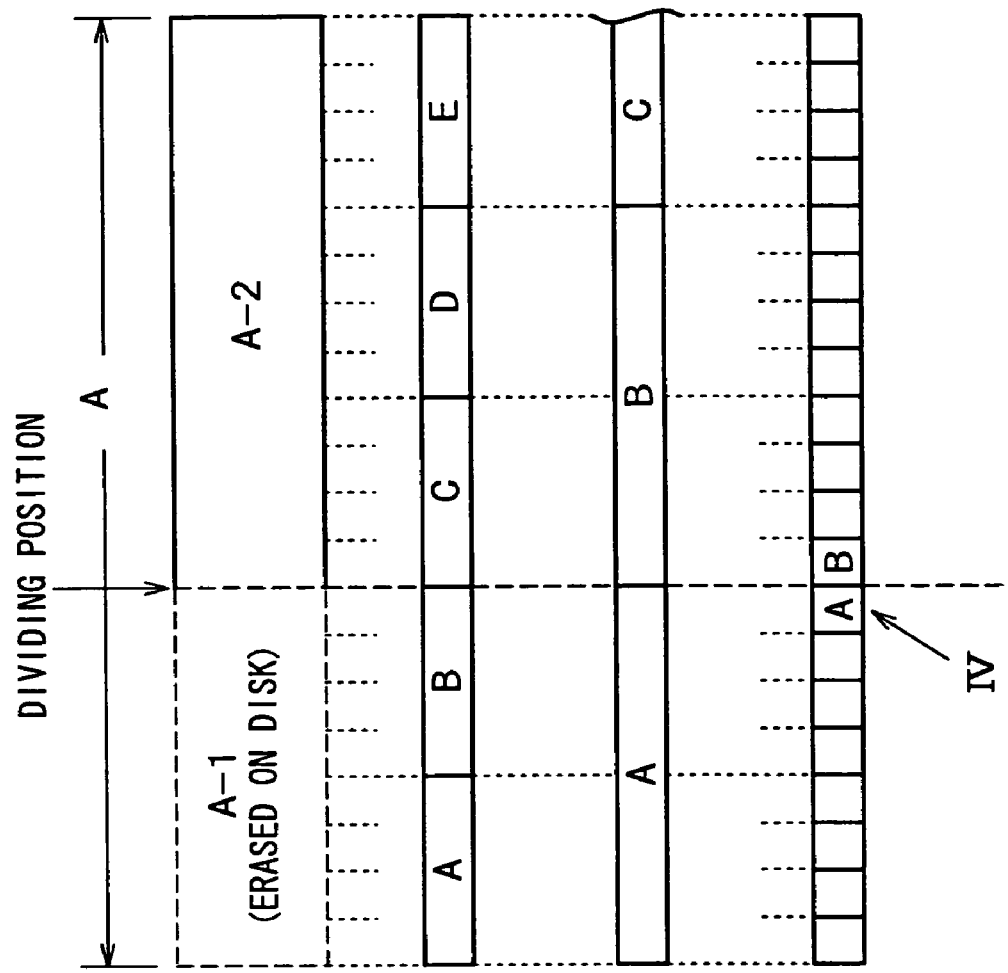

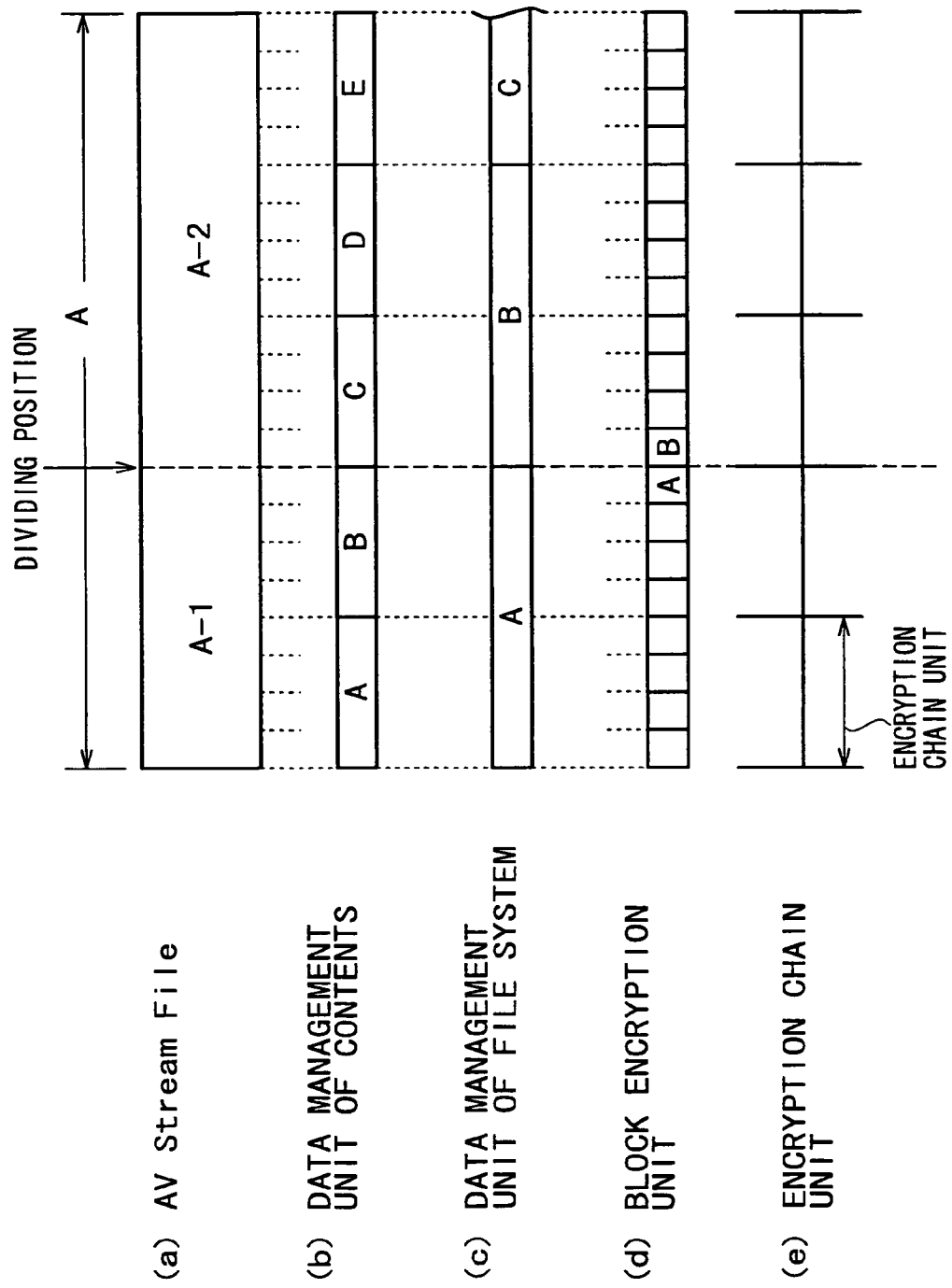

DATA EDITION METHOD AND DATA EDITION DEVICE

TECHNICAL FIELD

This invention relates to a data editing method and a data editing apparatus for editing data recorded on a predetermined recording medium.

BACKGROUND ART

A personal computer includes an HDD (Hard Disk Drive) as a storage medium.

As well known in the art, a file system is adopted for recording and reproduction of a file on and from such an HDD as just mentioned. For example, as a file system of the type mentioned, an FAT (File Allocation Table is known (for example, refer to Microsoft Extensible Firmware Initiative FAT32 File System Specification http://www.microsoft.com/hwdev/hardware/fatgen.asp).

In recent years, AV apparatus which can record and reproduce contents data such as video and audio data have been proposed and have become known as peripheral equipments of the personal computer described above.

Such an AV apparatus as just mentioned has, for example, a size and a shape with which it can be carried. The AV apparatus is connected to the personal computer by a predetermined digital interface so that, for example, it can fetch contents data from the personal computer side and record and retain the contents data on a predetermined recording medium loaded therein.

After the contents data are stored on the recording medium in this manner, the AV apparatus by itself can reproduce the contents data from the recording medium and output the contents data as sound and an image.

In order to manage the contents data recorded on the recording medium on such an AV apparatus as described above, also it has been proposed and implement to adopt, for example, a file system. Where a file system is adopted in this manner, since the form of the file management becomes similar to that in the personal computer connected through the data interface, the affinity with the personal computer increases as much, and in this regard, the availability is high.

Further, it is preferable to the user in terms of the convenience in use that such an AV apparatus as described above is provided with editing functions such as division and erasure of contents data.

However, where a file system is adopted for management of recorded data in such a manner as described above, this gives rise to the following problem.

Data management according to a file system directly manages data physically recorded on a recording medium. Accordingly, it is necessary to update the contents themselves of the file system so that, for example, in response to editing of contents data such as division or erasure, a result of the editing may be obtained appropriately.

For example, to such an AV apparatus as described above, updating of a file system is a significantly heavy process and a considerable load is applied to the system. Therefore, upon an editing process such as division or erasure described above, somewhat long time is required to end updating of the file system. As a result, considerable time is required for the editing process.

DISCLOSURE OF INVENTION

Therefore, taking the subject described above into consideration, it is an object of the present invention to make it possible for an editing process of contents data (stream data) managed as a file by a file system to be executed with a reduced processing burden to achieve improvement in efficiency of the system.

Therefore, taking the subject described above into consideration, it is an object of the present invention to reduce processing burden to achieve improvement in efficiency of the system in an editing process of contents data (stream data) managed as a file by a file system.

Thus, a data editing method is configured in the following manner.

In particular, in a data editing method according to the present invention, a first data management step and a second data management step are executed. The first data management step manages stream data recorded on a predetermined recording medium in a unit of a file based on a file system. The second data management step performs management in a unit of a track based on a track managing data file which includes track management information. The track management information is formed from information elements each of which is information corresponding to one of tracks each of which is a data part within a range of the stream data in the file unit and indicates coordination with the stream data of the file unit and information elements each of which indicates a data position of one of the tracks in the stream data of the corresponding file unit.

Further, where track division of dividing the stream data of the file unit to form a plurality of tracks or track erasure of erasing one of the tracks is to be performed, the second data management step executes an updating process for contents of the track management information in the track managing data file in response to a manner of the track division or track erasure.

Meanwhile, a data editing apparatus is configured in the following manner.

A data editing apparatus of the present invention includes first data management means and a second data management means. The first data management means manages stream data recorded on a predetermined recording medium in a unit of a file based on a file system. The second data management means performs management in a unit of a track based on a track managing data file which includes track management information. The track management information is formed from information elements each of which is information corresponding to one of tracks each of which is a data part within a range of the stream data in the file unit and indicates coordination with the stream data of the file unit and information elements each of which indicates a data position of one of the tracks in the stream data of the corresponding file unit.

Further, where track division of dividing the stream data of the file unit to form a plurality of tracks or track erasure of erasing one of the tracks is to be performed, the second data management means executes an updating process for contents of the track management information in the track managing data file in response to a manner of the track division or track erasure.

According to the present invention having the configurations described above, stream data recorded on a recording medium are first managed as a file by a file system. Then, a management structure is used wherein the stream data are managed in a unit of a track by a track managing data file managed by the file system. Thus, editing such as division or erasure in a unit of a track (track division or track erasure) is performed by rewriting contents of track management information having information contents which define each track in the track managing data file.

Where such a configuration as described above is adopted, when division or erasure editing in a unit of a track is to be performed, there is no necessity to rely upon rewriting of the file system.

BRIEF DESCRIPTION OF DRAWINGS

FIG. 1 is a block diagram showing an example of a configuration of a recording and reproduction apparatus of an embodiment of the present invention;

FIGS. 2A and 2B are views illustrating a format of a disk of the embodiment;

FIG. 3 is a schematic view showing an area structure of the disk of the embodiment;

FIG. 5 is a block diagram of a storage section of the recording and reproduction apparatus of the embodiment;

FIG. 6 is a diagrammatic view conceptively illustrating an example of a file configuration on the disk of the embodiment;

FIG. 9 is a diagrammatic view illustrating a relationship of the AV Track Index File and the AV Header File to the AV Stream File;

FIG. 17 is a flow chart illustrating a processing operation for on-disk erasure;

FIG. 19 is a view illustrating an example of a structure of data of a list produced by the process illustrated in FIG. 17;

FIG. 20 is a diagrammatic view illustrating a relationship of a data management unit of contents, a data management unit of the file system and a block encryption unit to the AV Stream File;

FIG. 21 is a diagrammatic view illustrating a case example wherein, where a track formed by dividing the encrypted AV Stream File is erased, an IV becomes a data part of an object of track erasure; and FIG. 22 is a diagrammatic view illustrating a relationship of a data management unit of contents, a data management unit of the file system, a block encryption unit and an encryption chain unit to the AV Stream File.

BEST MODE FOR CARRYING OUT THE INVENTION

Figure 4A:
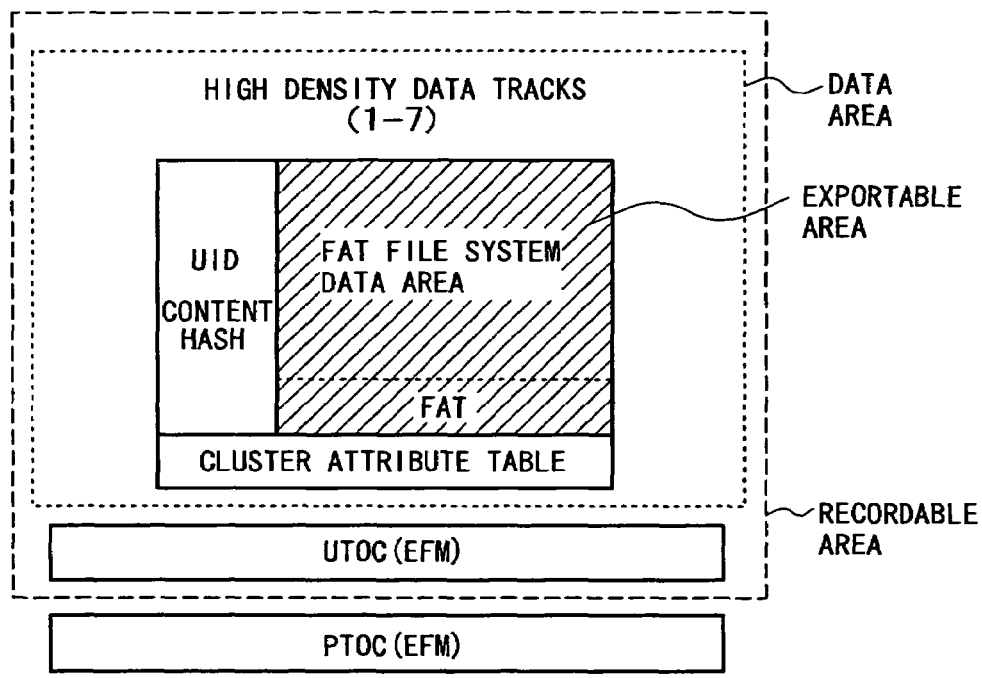
FIGS. 4A and 4B are diagrammatic views illustrating a management structure of the disk of the embodiment.

In the following, an embodiment of the present invention is described. It is to be noted that the description proceeds in the following order.

1. Configuration of the Recording and Reproduction Apparatus
2. Configuration of the Disk and the Storage Section
3. Management of AV Data
4. Track Division and Erasure Editing
5. On-Disk Erasure
6. On-Disk Erasure of a Block-Encrypted AV Stream File 1. Configuration of the Recording and Reproduction Apparatus A recording and reproduction apparatus as an embodiment is, as an example, a recording and reproduction apparatus for a disk of the mini disk (MD) system which is a magneto-optical disk for which data recording of the magnetic field modulation type is performed. It is to be noted that the recording and reproduction apparatus is a recording and reproduction apparatus which not only allows recording on a mini disk for music applications popularized already but also is ready for a high density disk which allows higher density recording and can be utilized not only for storage of video data but also for storage of various data for computer use.

A configuration of the recording and reproduction apparatus of the present embodiment is described with reference to FIG. 1.

In FIG. 1, the recording and reproduction apparatus 1 of the present embodiment is shown as an apparatus which can communicate data with an external apparatus as, for example, a personal computer (or network) 100.

The recording and reproduction apparatus 1 can function, for example, as an external storage apparatus for the personal computer 100 where the recording and reproduction apparatus 1 is connected to the personal computer 100 by a transmission line 101 such as a USB cable or the like. Or, where the recording and reproduction apparatus 1 is connected to a network through the personal computer 100 or through a function provided therefor by which the recording and reproduction apparatus 1 can be directly connected to a network, the recording and reproduction apparatus 1 can download music or various kinds of data and store the downloaded music or data on a disk loaded in a storage section 2 in the recording and reproduction apparatus 1.

On the other hand, the recording and reproduction apparatus 1 functions, for example, as an AV (Audio-Video) apparatus even if it is not connected to the personal computer 100 or the like. For example, the recording and reproduction apparatus 1 can record audio data and video data (AV data) inputted from another AV apparatus or the like on a disk or reproduce and output music data or the like recorded on the disk.

In short, the recording and reproduction apparatus 1 of the present embodiment is an apparatus which can be utilized as a data storage apparatus for universal use where it is connected to the personal computer 100 or the like and which by itself can be utilized also as a recording and reproduction apparatus ready for AV data.

The recording and reproduction apparatus 1 includes a storage section 2, a cache memory 3, a USB interface 4, an input and output processing section 5, a display section 6, an operation section 7, a system controller 8, a ROM 9, a RAM 10, a cache management memory 11 and an NV-RAM 12.

The storage section 2 performs recording and/or reproduction on/from a disk loaded therein. A configuration of a disk of the mini disk system used in the present embodiment and the storage section 2 ready for the disk is hereinafter described.

The cache memory 3 is a cache memory which performs buffering of data to be recorded on a disk by the storage section 2 or data read out from the disk by the storage section 2. The cache memory 3 is formed from, for example, a D-RAM.

Writing/readout of data into/from the cache memory is controlled by a task started by the system controller (CPU) 8.

The USB interface 4 performs processing for data transmission where it is connected, for example, to the personal computer 100 through the transmission line 101 as a USB cable.

The input and output processing section 5 performs processing for inputting and outputting of recording or reproduction data, for example, where the recording and reproduction apparatus 1 by itself functions as an audio apparatus.

The system controller 8 performs control of the entire recording and reproduction apparatus 1 and performs communication control with the personal computer 100 connected to the recording and reproduction apparatus 1.

The ROM 9 has operation programs, fixed parameters and so forth for the system controller 8 stored therein.

The RAM 10 is used as a work area by the system controller 8 and used as a storage area for various kinds of necessary information.

The RAM 10 stores, for example, various kinds of management information and special information read out from the disk by the storage section 2. The RAM 10 stores, for example, P-TOC data, U-TOC data, play list data, FAT data, a unique ID, and a hash value. The P-TOC data and the U-TOC data are management information of music tracks and so forth recorded on a mini disk. Further, while description is hereinafter given, a high density disk conforming to the mini disk system for which the recording and reproduction apparatus 1 of the present embodiment is ready uses an FAT file system constructed on a management form by the P-TOC and the U-TOC. The play list is information for managing addresses and so forth of music data and so forth by the ATRAC system or the like on a high density disk and is recorded as a file on the FAT system. Where a high density disk is loaded, information also of the FAT and the play list is read in. The unit ID, hash value and so forth are information used for an authentication process or encryption/decryption upon data transmission to and from the personal computer 100 or the like.

The cache management memory 11 is formed from, for example, an S-RAM, and stores information for managing the state of the cache memory 3. The system controller 8 refers to the cache management memory 11 to perform control of data cache processing. Information of the cache management memory 11 is hereinafter described.

The NV-RAM (Non-Volatile RAM) 12 is used as a storage area for data which should not disappear also when the power supply is off.

The display section 6 displays various kinds of information to be presented to a user under the control of the system controller 8. For example, the display section 6 displays an operation state, a mode state, title information of data of a tune or the like, a track number, time information and other information.

The operation section 7 has operation keys, a jog dial and so forth formed thereon as various operation elements for being operated by a user. The user would operate the operation section 7 to issue an instruction for recording or reproduction or for a required operation for data communication. The system controller 8 performs a predetermined control process based on the operation information inputted through the operation section 7.

Control by the system controller 8 when the personal computer 100 or the like is connected is, for example, such as follows.

The system controller 8 is enabled for communication with the personal computer 100 connected through the USB interface 4 and performs reception of a command such as a write request or a readout request, transmission of status information and other necessary information, and so forth.

The system controller 8 issues, for example, in response to loading of a disk into the storage section 2, an instruction to the storage section 2 to read out management information and so forth from the disk, fetches such read out information through the cache memory 3 and stores the information into the RAM 10.

As the management information of the P-TOC and the U-TOC is read in, the system controller 8 can grasp a track recording state of the disk.

Further, as a CAT is read in, the system controller 8 can grasp a high density data cluster structure in data tracks and is placed into a state wherein it is ready for an access request to a data track from the personal computer 100.

Further, with the unique ID and the hash value, the system controller 8 can perform disk authentication and other processes or transmit the values to the personal computer 100 so that they are processed by the personal computer 100.

If a readout request for certain data is received from the personal computer 100, then the system controller 8 controls the storage section 2 to execute readout of the data. The read out data undergo signal processing by an AV signal processing section not shown as occasion demands and are then written into the cache memory 3. However, if the data requested are already stored in the cache memory 3, the readout by the storage section 2 is not necessary. This is a so-called cache hit.

The system controller 8 performs control of reading out of the data written in the cache memory 3 and transmitting the data to the personal computer 100 through the USB interface 4.

If a write request for certain data is received from the personal computer 100, then the system controller 8 places the data transmitted thereto into the cache memory 3. Then, the system controller 8 controls the storage section 2 to record the data stored in the cache memory 3 on a disk.

It is to be noted that data writing on a disk is performed in a minimum unit called cluster. For example, one cluster includes 32 FAT sectors.

If the amount of data requested for recording by the personal computer 100 or the like is several sectors and is smaller than one cluster, then a process called blocking is performed. In particular, the system controller 8 controls the storage section 2 to read out a cluster which includes the FAT sectors. The cluster data read out are written into the cache memory 3.

Then, the system controller 8 supplies the data (recoding data) of the FAT sectors from the personal computer 100 to the cache memory 3 through the USB interface 4 so that the cache memory 3 executes rewriting of cluster data stored therein with the data of the FAT sectors.

Then, the system controller 8 causes the cluster data stored in the cache memory 3 in a state wherein the necessary FAT sectors are rewritten to be transferred to the storage section 2. The storage section 2 writes the data of the cluster unit on the disk.

It is to be noted that the foregoing is control for recording and reproduction of data involved in transfer, for example, to and from the personal computer 100, and data transfer upon recording or reproduction, for example, of audio data of the mini disk system is performed through the input and output processing section 5.

The input and output processing section 5 includes, for example, as an input system, an analog sound signal inputting section such as a line inputting circuit/microphone inputting circuit, an A/D converter, and a digital audio data inputting section. The input and output processing section 5 further includes an ATRAC compression encoder/decoder. The ATRAC compression encoder/decoder is a circuit for executing compression/decompression processing of audio data according to the ATRAC system. It is to be noted that naturally the recording and reproduction apparatus of the present embodiment may have a configuration by which compressed audio data by some other format such as the MP3 can be recorded and reproduced, and in this instance, the recording and reproduction apparatus may include an encoder/decoder compatible with the format of the compressed audio data.

Further, while the format with which video data can be recorded and reproduced by the present embodiment is not restricted particularly, for example, the MPEG4 may be employed. The input and output processing section 5 may include an encoder/decoder ready for such a format as just mentioned.

Furthermore, the input and output processing section 5 includes, as an output system, a digital audio data outputting section and an analog sound signal outputting section such as a D/A converter and a line outputting circuit/headphone outputting circuit.

Further, the input and output processing section 5 in this instance includes a cryptography processing section 5a. The cryptography processing section 5a performs an encryption process according to a predetermined algorithm, for example, for AV data to be recorded on a disk. Further, for example, where AV data read out from a disk are in an encrypted form, the cryptography processing section 5a executes a decryption process for decrypting the AV data as occasion demands.

Audio data are recorded on a disk as a process performed through the input and output processing section 5 when, for example, digital audio data (or an analog sound signal) are inputted as an input TIN to the input and output processing section 5. Linear PCM digital audio data inputted or linear PCM audio data inputted as an analog sound signal and converted by an A/D converter are ATRAC compression encoded and cumulatively stored into the cache memory 3. Then, the data are read out at a predetermined timing (in a data unit corresponding to an ADIP cluster) from the cache memory 3 and transferred to the storage section 2. The storage section 2 modulates the compressed data transferred thereto in accordance with a predetermined modulation method and records the modulated data on a disk.

When audio data of the mini disk system are reproduced from a disk, the storage section 2 demodulates the reproduced data into ATRAC compressed data and transfers the ATRAC compressed data to the cache memory 3. Then, the ATRAC compressed data are read out from the cache memory 3 and transferred to the input and output processing section 5. The input and output processing section 5 performs ATRAC compression decoding for the compressed audio data supplied thereto to produce linear PCM audio data and outputs the linear PCM audio data from the digital audio data outputting section. Or, the liner PCM audio data are converted into an analog sound signal by the D/A converter, and the analog sound signal is line-outputted/headphone-outputted.

It is to be noted that the configuration of the recording and reproduction apparatus 1 of FIG. 1 is an example, and for example, the input and output processing section 5 may include an input/output processing system ready not only for audio data but also for video data.

Further, for the connection to the personal computer 100, not the USB interface but some other external interface such as the IEEE 1394 may be used.

2. Configuration of the Disk and the Storage Section

A disk used as a recording medium by the recording and reproduction apparatus 1 of the present embodiment is, for example, a disk of the mini disk system. The recording and reproduction apparatus 1 is particularly ready not only for a mini disk for music used heretofore but also for a high density disk on which various kinds of data for computer use can be recorded.

FIGS. 2A and 2B illustrate specifications for an audio mini disk (and MD-DATA) and a high density disk for comparison.

As seen in FIG. 2A, according to the format of the mini disk (and MD-DATA), the track pitch is 1.6 μm and the bit length is 0.59 μm/bit. Further, the laser wavelength λ is λ=780 nm, and the numerical aperture NA of the optical head is NA=0.45.

As a recording method, a groove recording method is employed. In other words, a groove (groove on a surface of a disk) is used as a track for recording and reproduction.

As an address method, a method is adopted which makes use of a wobbled groove wherein wobbles as address information are formed on the opposite sides of a groove (track) formed as a single spiral.

It is to be noted that, in the present specification, an absolute address recorded by wobbling is referred to also as ADIP (Address in Pregroove).

As a modulation method for recording data, the EFM (8-14 modulation) method is adopted. Further, as an error correction method, the ACIRC (Advanced Cross Interleave Reed-Solomon Code) is adopted, and for the data interleave, convolution type data interleave is adopted. The redundancy of data is 46.3%.

Further, the detection method of data is a bit-by-bit method. As a disk driving method, the CLV (Constant Linear Velocity) is adopted, and the linear velocity of the CLV is 1.2 m/s.

The standard data rate upon recording and reproduction is 133 kB/s, and the recording capacity is 164 MB (in the MD-DATA, 140 MB).

Further, a data unit called cluster is used as a minimum rewriting unit, and one cluster is formed from 36 sectors including 32 main sectors and four link sectors.

Meanwhile, for the high density disk, two standards are available in the present situation. Here, the two standards for a high density disk are represented as high density disk (1) and high density disk (2).

First, according to the high density disk (1), the track pitch is 1.5 to 1.6 μm and the line density is 0.437 μm/bit, and the recording capacity is raised up to 300 MB. Further, the transfer rate at a standard speed is 4.37 Mbps, and the linear velocity is 2.4 m/sec.

Meanwhile, according to the high density disk (2), the track pitch is 1.25 μm and the line density is 0.16 μm/bit, and the recording capacity is raised up to 1 GB. Further, the transfer rate at a standard speed is 9.83 Mbps, and the linear velocity is 1.98 m/sec.

It is to be noted that, though not shown in FIG. 2B, as a modulation method for recording data, the RLL (1,7) PP (RLL: Run Length Limited, PP: Parity preserve/Prohibit rmtr (repeated minimum transition runlength) method which is considered to be suitable for high density recording is adopted. As an error correction method, the RS-LDC (Reed-Solomon-Long Distance Code) method with a BIS (Burst Indicator Subcode) having a higher correction capacity is used. For data interleave, block completion type interleave is used. The redundancy of data is 20.50%.

Further, the detection method for data is a Viterbi decoding method which uses the partial response PR (1,2,1) ML.

It is to be noted that the RLL (1-7) modulation and the RS-LDC error correction method are techniques disclosed, for example, in "Japanese Patent Laid-Open No. Hei 11-346154", "Internal Publication for Patent Application No. WO 00/07300" and so forth.

Meanwhile, the disk driving method is the CLV (Constant Linear Velocity) or the ZCAV (Zone Constant Angular Velocity).

An area structure on the disk is schematically shown in FIG. 3.

As shown in FIG. 3, the innermost circumference side of the disk is a P-TOC (pre-mastered TOC) region, and it has a physical structure as a pre-mastered area. In other words, the area is an area in which reproduction-only data in the form of embossed pits are recorded, and the P-TOC which is management information is recorded as the reproduction-only data.

A recordable area (region which allows magneto-optical recording) is provided on an outer circumference of the pre-mastered area and formed as a recordable and reproducible region in which a groove as a guide groove for a recording track is formed.

The innermost circumference side of the recordable area is a U-TOC region.

It is to be noted that, in the U-TOC region, a buffer area from the pre-mastered area and a power calibration area used for adjustment of the output power of a laser beam and so forth are provided. Further, U-TOC data are recorded repetitively by three times within an interval of particular three clusters in the U-TOC region.

While details of contents of the U-TOC are omitted herein, U-TOC sectors are prescribed so that addresses of tracks recorded in the program area, addresses of free areas and so forth can be recorded and information of a track name, recording date and so forth regarding each track can be recorded.

In the recordable area, an alert track and a data area are formed on the outer circumference side of the U-TOC region. The alert track is a warning track on which warning sound representing that this disk is a high density disk and cannot be reproduced by a conventional mini disk player is recorded. The data area is an area used for recording of audio data, data for computer use and so forth.

In particular, in an ordinary mini disk for music, one or a plurality of music tracks are recorded in the data area.

In the case of a high density disk, the data area is used as a storage region for various kinds of data.

A management structure of the disk is described with reference to FIGS. 4A and 4B.

Figure 4B:
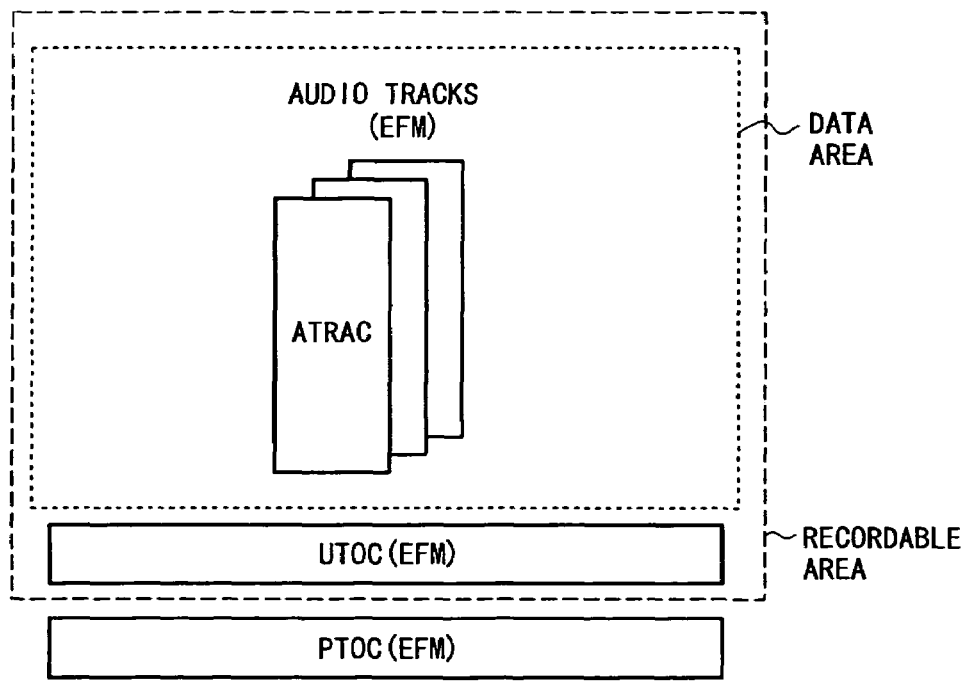

FIG. 4A shows a management structure in a mini disk system for music.

In this instance, the P-TOC and the U-TOC are recorded as management information.

The P-TOC is recorded in the form of pits as information which cannot be rewritten. In the P-TOC, the total capacity of the disk, the U-TOC position in the U-TOC region, the position of a power calibration area, the start position of the data area, the end position (lead-out position) of the data area and so forth are recorded as basic management information of the disk.

Meanwhile, the U-TOC recorded in the recordable area is management information which is rewritten in response to recording, erasure or the like of a track (audio track/data track), and hence manages the start position, end position and mode regarding each track (each of parts which form the tracks). The U-TOC manages also a part as a free area, that is, a writable area, in which no track is recorded as yet in the data area.

For example, where audio tracks of three tunes are recorded as ATRACT data in the data area as shown in the figures, the U-TOC manages the three tracks each with a start address, an end address and mode information, and further manages recording date and hour and title information.

The management structure of a high density disk is such as shown in FIG. 4A.

Also in the high density disk, the U-TOC and the P-TOC are recorded in a method which conforms to the conventional mini disk system.

While one high density data track is shown in the data area of FIG. 4A, the U-TOC manages the high density data track as one track.

In particular, the U-TOC manages one or a plurality of part positions as the entire data track on the disk. It is to be noted that also the position of the alert tracks is managed by the U-TOC.

A high density data track is a track formed with high density data modulated in accordance with the RS-LDC and RLL (1-7) PP method.

In the high density data track, a cluster attribute table (CAT: Cluster Attribute Table) for managing high density data clusters included in the data track is recorded. The CAT manages attributes (publication is permitted/inhibited, normal/abnormal, and so forth) of each of the high density data clusters which form the data track.

A high density data cluster whose publication is inhibited in the data track is used to record a unique ID (UID) unique to the disk and a hash value (hash) for checking of data falsification which are used for the copyright protection and so forth. Naturally, various kinds of other information which should not be open to the public may be recorded in addition to the information mentioned.

The region which should not be open to the public allows restrictive accessing by only those apparatus which are specifically permitted for accessing.

A region (exportable area) which includes high density data clusters which can be laid open in the data track is a region which can be accessed by an external computer or the like through a data interface for universal use such as a USB interface or a SCSI interface and can be utilized as a recording region.

For example, in the case of FIG. 4A, it is shown that an FAT file system including an FAT and data files managed by the FAT is constructed in the exportable area.

In particular, data recorded in the exportable area are not managed by the U-TOC but are managed with management information for universal use such as the FAT and are data which can be recognized by an external computer which does not comply with the mini disk system.

Where music data or the like of the ATRAC system or the like are recorded on the FAT system, a play list is recorded as management information for managing files of such music data or the like. The play list is recorded as a file on the FAT system, and upon reproduction of a music data file, the system controller of the recording and reproduction apparatus 1 grasps addresses and so forth from the play list.

It is to be noted that a plurality of data tracks each having such a structure as described above may be recorded on a disk. In this instance, each of the data tracks is managed as one track from the U-TOC, and data in the exportable area in each of the data tracks is managed by the FAT or the like. For example, each of the data tracks has an FAT file system autonomously. Or, one FAT file system may be recorded over a plurality of data tracks.

While an example wherein information such as a unique ID is data which is not managed by the FAT in the data track is described above, it may be recorded in any logical form only if it is handled as information which is not managed by the FAT. For example, a track for exclusive use for information which should not be laid open may be provided as a track which is managed, for example, directly from the U-TOC, or such information as described above may be recorded in the U-TOC/P-TOC. Further, a portion in the U-TOC region which is not used for the U-TOC may be used to provide a recording region for information which should not be laid open.

It is to be noted that, although a conventional mini disk is called "mini disk for music" for the convenience of description, also a mini disk known as MD-DATA falls in the criterion of the mini disk for music.

Naturally, music data may possibly be recorded as a data file on a high density disk. Such recording may be performed, for example, upon downloading of a music file from a network or a personal computer.

The storage section 2 shown in FIG. 1 is formed as a disk drive section which is ready for such a mini disk for music as described above and a high density disk as a data recording medium for universal use.

An example of a configuration of the storage section 2 is shown in FIG. 5.

The disk 90 shown is a mini disk for music, a high density disk (1) or another high density disk (2) described above.

In the storage section 2, the disk 90 loaded is driven to rotate in accordance with the CLV method by a spindle motor 29.

Upon recording/reproduction, a laser beam is illuminated upon the disk 90 by an optical head 19.

Upon recording, the optical head 19 outputs a laser beam of a high power level for heating a recording track up to its Curie temperature. Upon reproduction, the optical head 19 outputs a laser beam of a comparatively low power level for detecting data from reflected light by a magnetic Kerr effect. To this end, though not particularly shown, a laser diode as laser outputting means, an optical system including a polarizing beam splitter, an objective lens and so forth, and a detector for detecting the reflected light are incorporated in the optical head 19. The objective lens provided in the optical head 19 is supported for displacement in a radial direction of the disk and a direction toward or away from the disk, for example, by a two-axis mechanism.

A magnetic head 18 is disposed at a position opposing to the optical head 19 across the disk 90. The magnetic head 18 performs an operation of applying a magnetic field modulated with recording data to the disk 90.

Further, though not shown, a thread motor and a thread mechanism are provided for moving the entire optical head 19 and the magnetic head 18 in a radial direction of the disk.

The storage section 2 includes, in addition to a recording and reproduction head system including the optical head 19 and the magnetic head 18 and a disk rotating drive system including the spindle motor 29, a recording processing system, a reproduction processing system, a servo system and so forth.

The recording processing system includes a block which performs modulation of a first modulation method (EFM modulation and ACIRC encoding) upon recording on a mini disk for music and another block which performs a second modulation method (RLL (1-7) PP modulation and RS-LDC encoding) upon recording on a high density disk.

The reproduction processing system includes a block for performing demodulation corresponding to the first modulation system (EFM demodulation and ACIRC decoding) upon reproduction of a mini disk for music (and the U-TOC of a high density disk) and another block for performing demodulation corresponding to the second modulation method (RLL (1-7) demodulation based on data detection using partial response PR (1,2,1) and Viterbi decoding, and RS-LDC decoding) upon reproduction of a high density disk.

Information detected as reflected light upon illumination of a laser beam of the optical head 19 upon the disk 90 (photo-current obtained through detection of reflected light of the laser beam by the photo-detector) is supplied to an RF amplifier 21.

The RF amplifier 21 performs current-voltage conversion, amplification, matrix calculation and so forth for the detection information inputted thereto to extract a reproduction RF signal, a tracking error signal TE, a focusing error signal FE, groove information (ADIP information recorded as wobbling of a track on the disk 90) and so forth as reproduction information.

Upon reproduction of a mini disk for music, a reproduction RF signal obtained by the RF amplifier is processed by an EFM demodulation section 24 and an ACIRC decoder 25.

In particular, the reproduction RF signal is binarized into an EFM signal string and EFM demodulated by the EFM demodulation section 24 and further undergoes error correction and deinterleave processing by the ACIRC decoder 25. In other words, at this point of time, the reproduction RF signal is converted into ATRAC compression data.

Further, upon reproduction of a mini disk for music, a selector 26 selects the B contact side, and the demodulated ATRAC compression data are outputted as reproduction data from the disk 90. In this instance, the compressed data are supplied to the cache memory 3 of FIG. 1.

On the other hand, upon reproduction of a high density disk, a reproduction RF signal obtained by the RF amplifier is processed by an RLL (1-7) PP demodulation section 22 and an RS-LDC decoder 23.

In particular, the reproduction RF signal undergoes data detection using the PR (1,2,1) and Viterbi decoding by the RLL (1-7) PP demodulation section 22 so that reproduction data as an RLL (1-7) code string are obtained, and an RLL (1-7) decoding process is performed for the RLL (1-7) code string. Further, the reproduction data undergoes error correction and deinterleave processing by the RS-LDC decoder 23.

Further, upon reproduction of a high density disk, the selector 26 selects the A contact side, and the demodulated data is outputted as reproduction data from the disk 90. In this instance, the demodulation data are supplied to the cache memory 3 of FIG. 1.

The tracking error signal TE and the focusing error signal FE outputted from the RF amplifier 21 are supplied to a servo circuit 27 while the groove information is supplied to an ADIP decoder 30.

The ADIP decoder 30 performs band limitation for the groove information using a band-pass filter to extract wobble components and then performs FM demodulation and biphase demodulation to extract an ADIP address.

The extracted ADIP address which is information of an absolute address on the disk is supplied to the system controller 8 shown in FIG. 8. The system controller 8 executes a required control process based on the ADIP address.

The groove information is supplied to the servo circuit 27 for spindle servo control.

The servo circuit 27 produces a spindle error signal for CLV servo control based on an error signal obtained, for example, by integrating the phase error of the groove information from a reproduction clock (PLL system clock upon decoding).

Further, the servo circuit 27 produces various servo control signals (tracking control signal, focusing control signal, thread control signal, spindle control signal and so forth) based on a spindle error signal, a tracking error signal and a focusing error signal supplied from the RF amplifier 21 as described above or a track jumping instruction, an access instruction or the like from the system controller 8. The servo circuit 27 outputs the produced servo control signals to a motor driver 28. In short, the servo circuit 27 performs necessary processes such as a phase compensation process, a gain process and a target value setting process for the servo error signals and instructions described above to produce various servo control signals.

The motor driver 28 produces required servo drive signals based on the servo control signals supplied from the servo circuit 27. The servo drive signals here are two-axis drive signals (two signals for a focusing direction and a tracking direction) for driving the two-axis mechanism, a thread motor drive signal for driving the thread mechanism, and a spindle motor drive signal for driving the spindle motor 29.

Based on such servo drive signals as described above, focusing control and tracking control for the disk 90 and CLV control for the spindle motor 29 are performed.

When a recording operation on the disk 90 is to be executed, data are supplied from the cache memory 3.

Upon recording of a mini disk for music, a selector 16 is connected to the B contact, and accordingly, an ACIRC encoder 14 and an EFM modulation section 15 function.

In this instance, compressed data from an audio processing section not shown are inputted from DATA IN and undergoes interleaving and addition of error correction codes by the ACIRC encoder 14, and then undergoes EFM modulation by the EFM modulation section 15.

Then, the EFM modulation data are supplied to a magnetic head driver 17 through the selector 16, and the magnetic head 18 performs application of a magnetic field based on the EFM modulation data to the disk 90 to perform data recording.

Upon recording of a high density disk, the selector 16 is connected to the A contact, and accordingly, an RS-LDC encoder 31 and an RLL (1-7) PP modulation section 13 function.

In this instance, high density data from a memory transfer controller not shown undergo interleaving and addition of error correction codes of the RS-LDC system by RS-LDC encoder 31 and is then subject to RLL (1-7) modulation by the RLL (1-7) PP modulation section 13.

Then, the recording data in the form of an RLL (1-7) code string is supplied to the magnetic head driver 17 through the selector 16, and the magnetic head 18 performs application of a magnetic field based on the modulation data to the disk 90 to perform data recording.

Upon such reproduction and recording as described above, a laser driver/APC 20 causes the laser diode to execute a laser beam emitting operation. However, the laser driver/APC 20 performs an APC (Automatic Laser Power Control) operation as well.

In particular, though not shown, a detector for monitoring the laser power is provided in the optical head 19, and a monitor signal of the detector is fed back to the laser driver/APC 20. The laser driver/APC 20 compares the laser power at present obtained as the monitor signal with a laser power set in advance and causes the error between them to reflect on the laser drive signal thereby to control the laser power to be outputted stably with the preset value from the laser diode.

It is to be noted that, as the laser power, a value as a reproduction laser power or a recording laser power is set to a register in the inside of the laser driver/APC 20 by the system controller 8.

The operations described above (accessing operation, various servo operations, data writing operation, and data reading out operation) are executed based on an instruction from the system controller 8.

3. Management of AV Data

As can be recognized from the foregoing description, for example, while a mini disk for music allows recording only of audio data in principle, a high density disk allows recording of general purpose data.

Such general purpose data include, for example, AV data such as audio data and video data. In other words, AV data can be recorded also on the high density disk of the present embodiment. Particularly as regards recording of AV data, since the high density disk has a great capacity in comparison with a mini disk for music, it is considered that the high density disk is suitable for recording of video data which are stream data of a high data rate.

Thus, in the present embodiment, AV data recorded on the high density disk are managed on an FAT file system in such a manner as illustrated in FIG. 6.

First, in the FAT file system, management is performed such that a directory for AV data exists. Here, the directory for AV data provisionally has a directory name of "Hi-MDV".

First, the entity of the AV data is managed in a unit of a file as an AV Stream File and is stored into the directory Hi-MDV. Then, an AV Header File is stored in such a manner as to correspond to each AV Stream File stored in the directory Hi-MDV. In the AV Header File, information of predetermined contents regarding the coordinated AV Stream File in such a manner as hereinafter described is stored. Further, the coordination between an AV Header File and an AV Stream File here is established by applying file names which are common except the extensions to the files.

An AV Track Index File is a file in which management information for managing AV data stored in the directory Hi-MDV in a unit of a track is described. While it is recognized from the following description, in the present embodiment, an AV Stream File of AV data stored in the directory Hi-MDV is a file managed on the FAT file system at all but is not handled as a track. The tracks are managed by the AV Track Index File.

Figure 7:
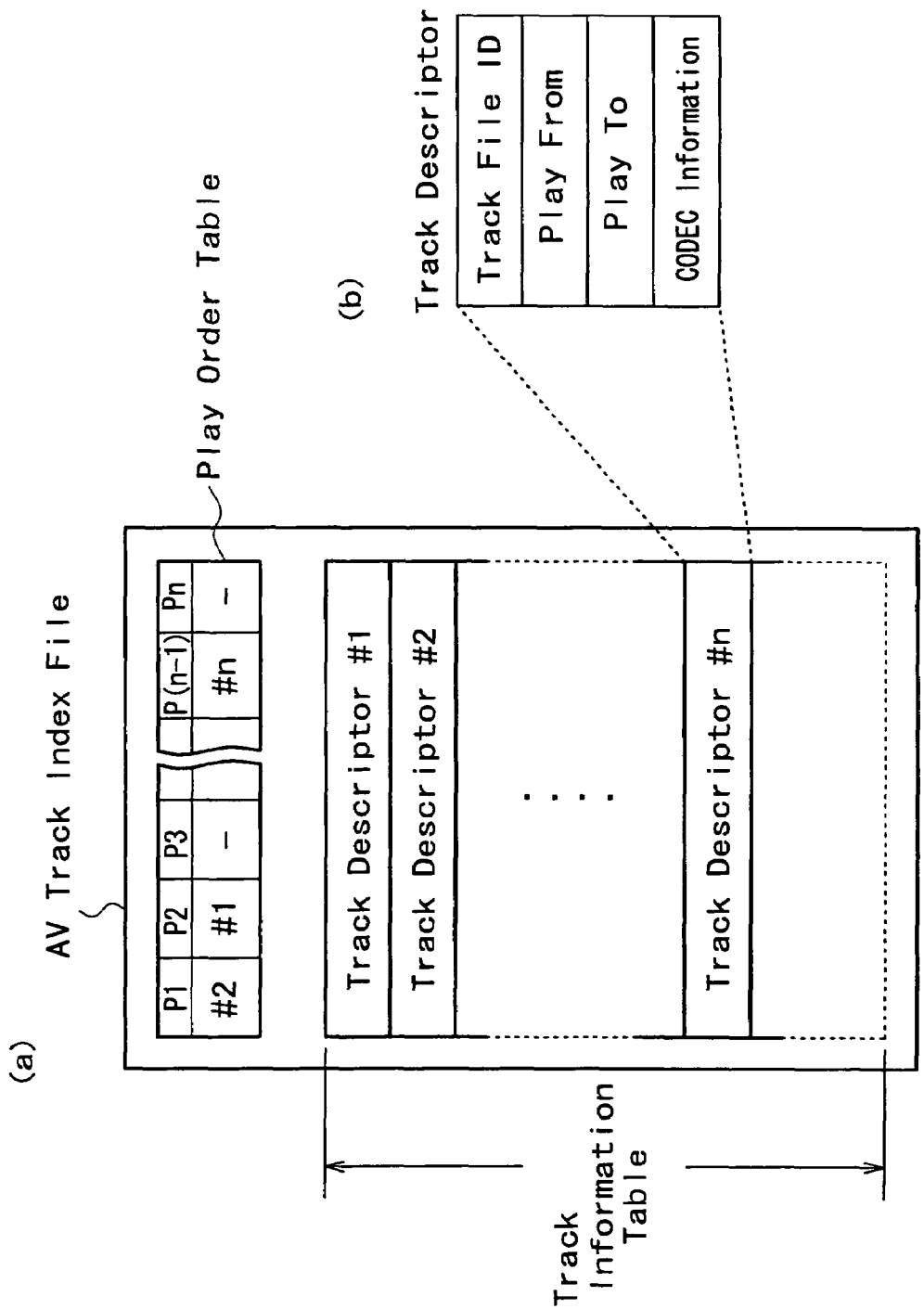
FIG. 7 is a diagrammatic view showing an example of a structure of an AV Track Index File of the embodiment.

(a) of FIG. 7 shows an example of a configuration of the AV Track Index File. As shown in this figure, the AV Track Index File includes a Play Order Table and a Track Information Table.

First, the Track information Table includes one or more Track Descriptors. Each Track Descriptor is provided corresponding to one track, and has a number applied thereto like Track Descriptor #1, #2, ..., #n as seen in the figure. It is to be noted that Track Descriptor numbers may be lost depending upon a result of editing by, for example, division erasure and need not necessarily be consecutive numbers.

The Play Order Table defines a reproduction order in a unit of a track. For example, the Play Order Table in this instance includes storage positions represented by storage position numbers P1 to P(n) in order from the left, and Track Descriptor numbers are stored in the storage positions. Here, since #2 is stored in the storage position number P1, #1 in the storage position number P2, ..., and #n in the storage position number P(n−1), the track reproduction order is an order of a track indicated by the Track Descriptor #2→track indicated by Track Descriptor #1→ ... →track indicated by Track Descriptor #n. It is to be noted that, in the Play Order Table in this instance, for example, the storage position number P3 is represented as "-", and this represents that no Track Descriptor number is stored. In short, in the present embodiment, in the case of the figure, the Track Descriptor numbers need not be stored in a leftwardly packed state beginning with the storage position number P1 in accordance with the reproduction order. The reproduction order is obtained by successively picking up the Track Descriptor numbers stored in accordance with the storage position numbers.

One Track Descriptor has information contents illustrated in (b) of FIG. 7. In particular, one Track Descriptor has Track File ID, Play From, Play To and CODEC Information.

The Track File ID indicates a file ID of an AV Stream File (and AV Header File) including data of a track indicated by the current Track Descriptor. The file ID corresponds to the file name, for example,: given to the AV Stream File (and AV Header File).

The Play From indicates the time at which reproduction of the track indicated by the current Track Descriptor in the AV Stream File indicated by the file ID is to be started. The Play To indicates the time at which reproduction should be ended.

The CODEC Information stores information regarding the method of the codec of the AV Stream File and time information and so forth regarding data after the codec.

Figure 8A:
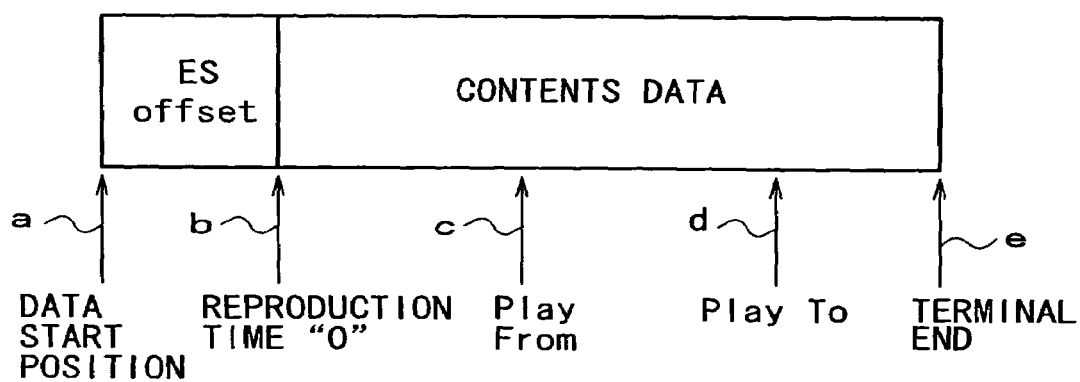
FIGS. 8A and 8B are diagrammatic views showing an embodiment of a structure of an AV Stream File and an AV Header File.

FIG. 8A shows a structure of an AV Stream File.

Referring to FIG. 8A, from a data start position of the AV Stream File indicated by an arrow mark a, a region as an ES (Elementary Stream) Offset is sometimes provided. The ES Offset is added in response to the fact that the AV Stream File of the present embodiment is managed by the FAT file system. In the FAT file system, for example, a condition that recording and reproduction of data is performed in a unit of a cluster exists. A reproduction start position (reproduction time "0") of contents data indicated by an arrow mark b is not necessarily started from the top of a sector as a result of such processing as writing upon recording or such a processing as division, on-disk erasure or the like as hereinafter described. In order to fill up a free area in a cluster including a reproduction start position of contents data, the ES Offset is defined in such a manner as described above.

Following the ES Offset, contents data which are the entity of AV data is disposed.

Here, the Play From and the Play To shown in (b) of FIG. 7 indicate reproduction time of contents data at a start position and an end position of the track as indicated, for example, by arrow marks c and d in FIG. 8A.

In particular, a track in the present embodiment can be formed from part of contents data (AV Stream File). Naturally, if the Play From indicates the reproduction time "0" of the contents data and the Play To indicates the time of the last end position of the contents data indicated by an arrow mark e in FIG. 8A, then the track includes the contents data of all portions of one AV Stream File.

Figure 8B:
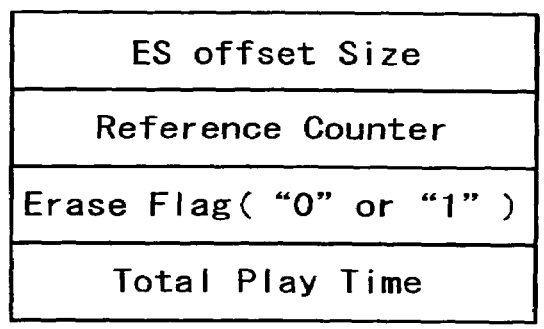

FIG. 8B shows an example of information contents which one AV Header File has.

First, the ES Offset Size indicates the data size regarding the ES Offset of an AV Stream File to which the current AV Header File corresponds.

Further, in the present embodiment, although details are hereinafter described, one AV Stream File is managed in such a manner that a plurality of tracks exit in a single AV Stream File as a result of, for example, a division editing process for AV data. In this instance, a plurality of Track Descriptors to be referred to exist in a corresponding relationship to a single AV Stream File. In other words, the number of Track Descriptors to be referred to in a corresponding relationship to one AV Stream File is variable.

The Reference Counter indicates the number of Track Descriptors to be referred to in this manner. For example, if the value indicated by the Reference Counter is "2", then the number of Track Descriptors to be referred to with respect to an AV Stream File to which the AV Header File corresponds is 2. Then, this indicates that data parts as two tracks exist in the AV Stream File.

The Erase Flag has a flag which indicates 1 when a track erased by "track erasure" exists in an AV Stream File to which the AV Header File corresponds. Although details are hereinafter described, the "track erasure" is a process of performing track erasure by rewriting on the AV Track Index File as an editing process, and conversely speaking, rewriting of the FAT file system is not performed. In other words, it is regarded that the track is erased on the AV Track Index File, but on the FAT file system, it is managed that the AV Stream File itself which includes the track-erased data part is recorded on the disk.

The Total Play Time indicates total reproduction time of an AV Stream File to which the AV Header File corresponds. In other words, the Total Play Time indicates reproduction time at the last end indicated by an arrow mark e in FIG. 8A.

It is to be noted that, where the AV Header File has such a structure and information contents as described above, the information contents described above can be set to a fixed length such that a predetermined number of bytes are allocated. In short, the AV Header File can be set to a fixed length. Where the AV Header File has a fixed length, since the size thereof does not vary also in a case wherein, for example, the AV Header File registered already on the disk is updated, such a situation that, for example, a plurality of data parts which form the single AV Header File are recorded in a physically discrete state on the disk does not occur. Consequently, an advantage that management of AV Header Files by the FAT is further simplified and readout, accessing and so forth are facilitated is obtained. In this manner, in the present embodiment, the processing burden on the FAT file system is moderated also by making AV Header Files have a fixed length.

Now, an example of track management for a single AV Stream File is described with reference to FIG. 9 taking the foregoing description into consideration. The track management illustrated in FIG. 9 is the simplest example and indicates track management in a case wherein an AV Stream File is managed as a single track. For example, in a case wherein a single AV Stream File is recorded on a disk, if such a marking operation as track division is not particularly performed halfway, then such a relationship between the AV Stream File and the track as illustrated in FIG. 9 is obtained.

First, the AV Stream File shown in (b) of FIG. 9 here has a file name and an extension of MP000007.VSF. In particular, it is indicated by the extension VSF that the file is an AV Stream File, and the AV Stream File is specified by the file name of MP000007.

Then, it is assumed that the AV Stream File has a region of the ES Offset of 1 Kbytes from the data start position, and following this, contents data of total reproduction time "100" are disposed and recorded on the disk.

An AV Header File coordinated with the AV Stream File is shown in (c) of FIG. 9. This AV Header File has a file name and an extension of MP000007.VHF. It is indicated by the extension VHF that the file is an AV Header File, and the AV Header File is specified by the file name of MP000007.

Then, the AV Stream File of (b) of FIG. 9 and the AV Header File of (c) of FIG. 9 are common in "MP000007" at the file name portions other than the extensions thereof, and consequently, they are coordinated with each other.

It is to be noted that it is described for the confirmation that the file names (+ extension) of the AV Stream File and the AV Header File are applied under the management of the FAT file system.

Then, in a coordinated relationship to the fact that the ES Offset of the AV Stream File of (b) of FIG. 9 has 1 Kbytes, 1000 indicating such 1 Kbytes is placed in the ES Offset Size of the AV Header File of (c) of FIG. 9.

Further, the Reference Counter has a value 1 and indicates that the number of Track Descriptors to be referred to is 1.

Meanwhile, the Erase Flag has a value 0, and this indicates that a track erased by "track erasure" does not exist in the AV Stream File (contents data) illustrated in (b) of FIG. 9.

The Total Play Time has 100 placed therein in a coordinated relationship to the fact that the reproduction time at the last end of the contents data illustrated in (b) of FIG. 9 is "100".

Further, one Track Descriptor #n to be referred to is indicated in the Track Information Table in the AV Track Index File shown in (a) of FIG. 9 in a coordinated relationship to the AV Stream File of (b) of FIG. 9.

While 7 is placed in the Track File ID of the Track Descriptor #n in the figure, this indicates "000007" in the file name "MP000007" used commonly by the AV Stream File of (b) of FIG. 9 and the AV Header File of (c) of FIG. 9. In particular, the Track File ID in this instance indicates a value given commonly to the file names of the AV Stream File and the AV Header File, and consequently, a coordinated relationship among the AV Stream File, AV Header File and Track Descriptor is specified.

Further, 0 indicating the reproduction time "0" of the contents data is placed in the Play From of the Track Descriptor #n. Further, the Play To has placed therein 100 which corresponds to the reproduction time "100" at the last end of the contents data. If the Play From and the Play To of the Track Descriptor #n are referred to, then it can be recognized that the contents data of the AV Stream File of (b) of FIG. 9 should be reproduced as one track from the start position (reproduction time "0") to the end position (reproduction time "100").

Here, it is assumed that the CODEC Information here is the type X, and actually it stores information regarding a required codec.

Figure 10:
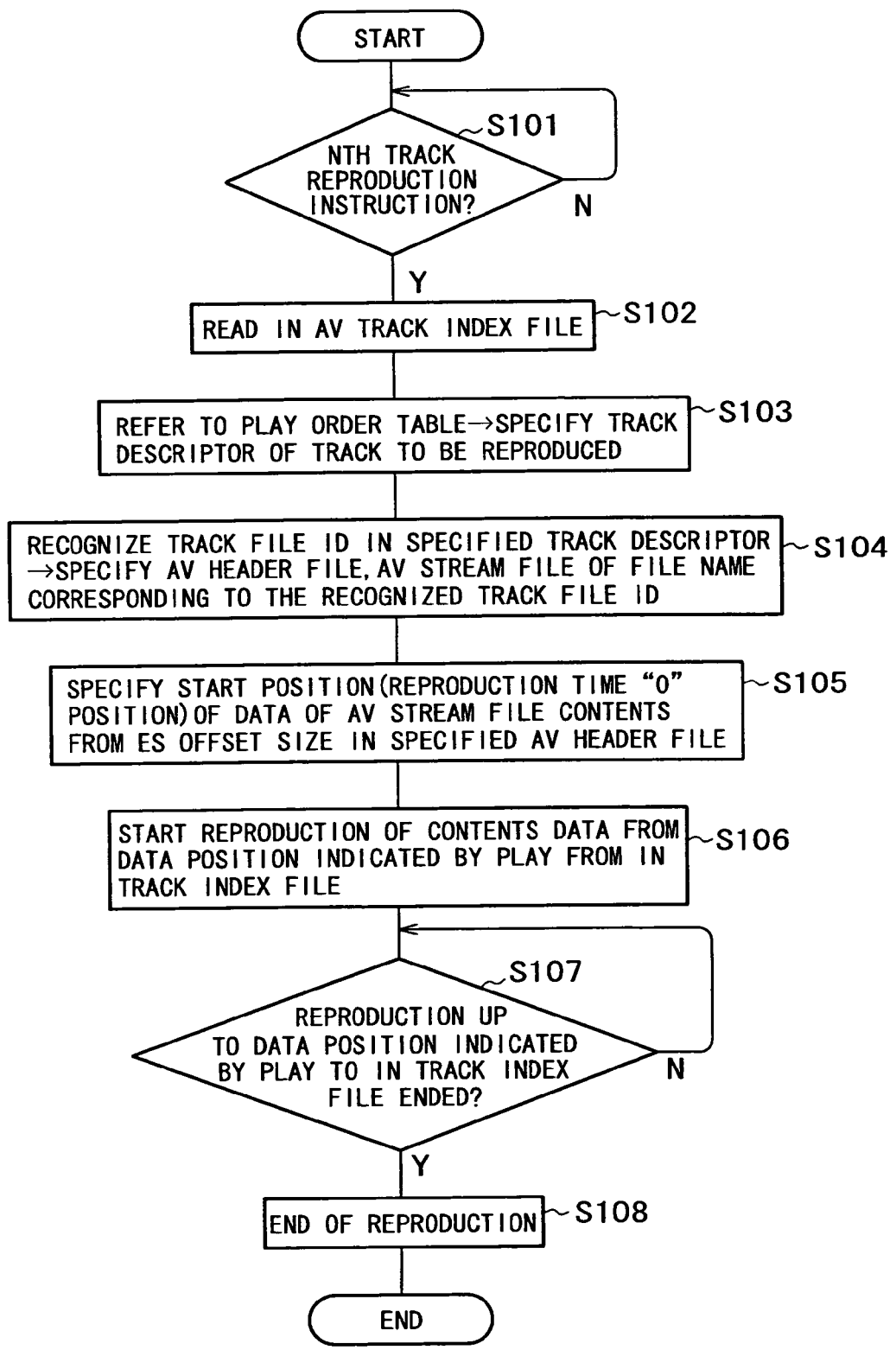
FIG. 10 is a flow chart illustrating a processing operation for track reproduction.

Now, a processing operation for reproducing a track to be reproduced nth is described with reference to a flow chart of FIG. 10. It is to be noted that the process illustrated in this figure is executed by the system controller 8 of the recording and reproduction apparatus 1 of the present embodiment.

First, the system controller 8 stands by at step S101 until a track reproduction instruction is received. Then, for example, if an instruction to start reproduction is issued together with designation of a track to be reproduced nth through an operation of the operation section 7 by the user or the like and then a command is generated in response to the instruction, then the processing of the system controller 8 advances to steps S102 et seq.

At step S102, the system controller 8 executes reading in of the AV Track Index File. It is to be noted that, although this reading in may be performed as readout from the disk, it may be performed otherwise as reading in from the RAM 10. In other words, upon loading of the disk, the AV Track Index File is read out from the disk and stored into the RAM 10 so that the RAM 10 is accessed thereafter to read in the AV Track Index File as occasion demands. Where this is employed, there is no necessity to access the disk every time and the process can be executed in a reduced period of time as much.

At next step S103, the system controller 8 refers to the Play Order Table of the AV Track Index File thus read in to specify the number of the Track Descriptor whose reproduction order number is n. To this end, the system controller 8 may perform, for example, successive scanning from the storage position number P1 of the Play Order Table and refer to the number of the Track Descriptor hit nth in the scanning.

Then at next step S104, the system controller 8 recognizes the Track File ID stored in the Track Descriptor of the number specified at step S103 described above. Then, the system controller 8 specifies an AV Header File and an AV Stream File to which a file name corresponding to the recognized Track File ID is given.

At step S105, the system controller 8 refers to the ES Offset Size stored in the AV Header File specified at step S104 described above to specify the reproduction start position of the AV Stream File specified at step S104 as described above similarly. In short, the system controller 8 specifies the position of the reproduction time "0" which is the start position of the contents data.

At next step S106, the system controller 8 recognizes the value of the Play From stored in the AV Header File specified at step S104 formerly. Then, the system controller 8 accesses the reproduction time position shifted by the time of the Play From from the base point given by the position of the reproduction time "0" of the contents data specified at step S105 described above. Then, the system controller 8 starts reproduction of the contents data beginning with the reproduction time position thus accessed.

Then at step S107, the system controller 8 recognizes the value of the Play To stored in the AV Header File specified at step S104 formerly and then recognizes the reproduction time position shifted by the time of the Play To from the base point given by the position of the reproduction time "0" of the contents data. Then, the system controller 8 stands by until the reproduction up to the reproduction time position indicated by the time of the Play To comes to an end.

Then, when it is discriminated that the reproduction up to the reproduction time position indicated by the time of the Play To comes to an end, this signifies that the reproduction of the nth track is completed fully, and the system controller 8 thus executes, for example, a reproduction end process at step S108.

In this manner, it can be recognized that, in the present embodiment, data management in a unit of a track and reproduction control are possible by referring to the contents of an AV Track Index File and an AV Header File. This signifies that, when data management in a unit of a track and reproduction control are executed, not the contents of management information on the level of the FAT file system but an index information file (AV Track Index File), a header file (AV Header File) and so forth which are managed by the FAT file system are used.

4. Track Division and Erasure Editing

Under the track management described above, editing can be performed in a unit of a track by altering the contents of an AV Track Index File and an AV Header File. Here, division editing of a track and track erasure editing are described as such editing processes.

First, track division editing is described.

Here, it is assumed that the management state of a track before the track division editing is such as described hereinabove with reference to FIG. 9. In particular, the AV Stream File of the file name=MP000007.VSF shown in (b) of FIG. 9 is managed as one track. In the following description, editing of track division and track erasure performed for the AV Stream File of the file name=MP000007.VSF shown in (b) of FIG. 9 is described.

It is assumed that track division of the AV Stream File which is managed as one track in such a manner as described hereinabove with reference to (b) of FIG. 9 is performed in such a manner as illustrated in (b) of FIG. 11. In particular, it is assumed that the contents data of the AV Stream File of the file name=MP000007.VSF are divided into a track including a data part of the production time "0" to "80" and another track including another data part of the reproduction time "80" to "100". It is to be noted that the former is hereinafter referred to as track #n and the latter is hereinafter referred to as track #m.

Figure 11:
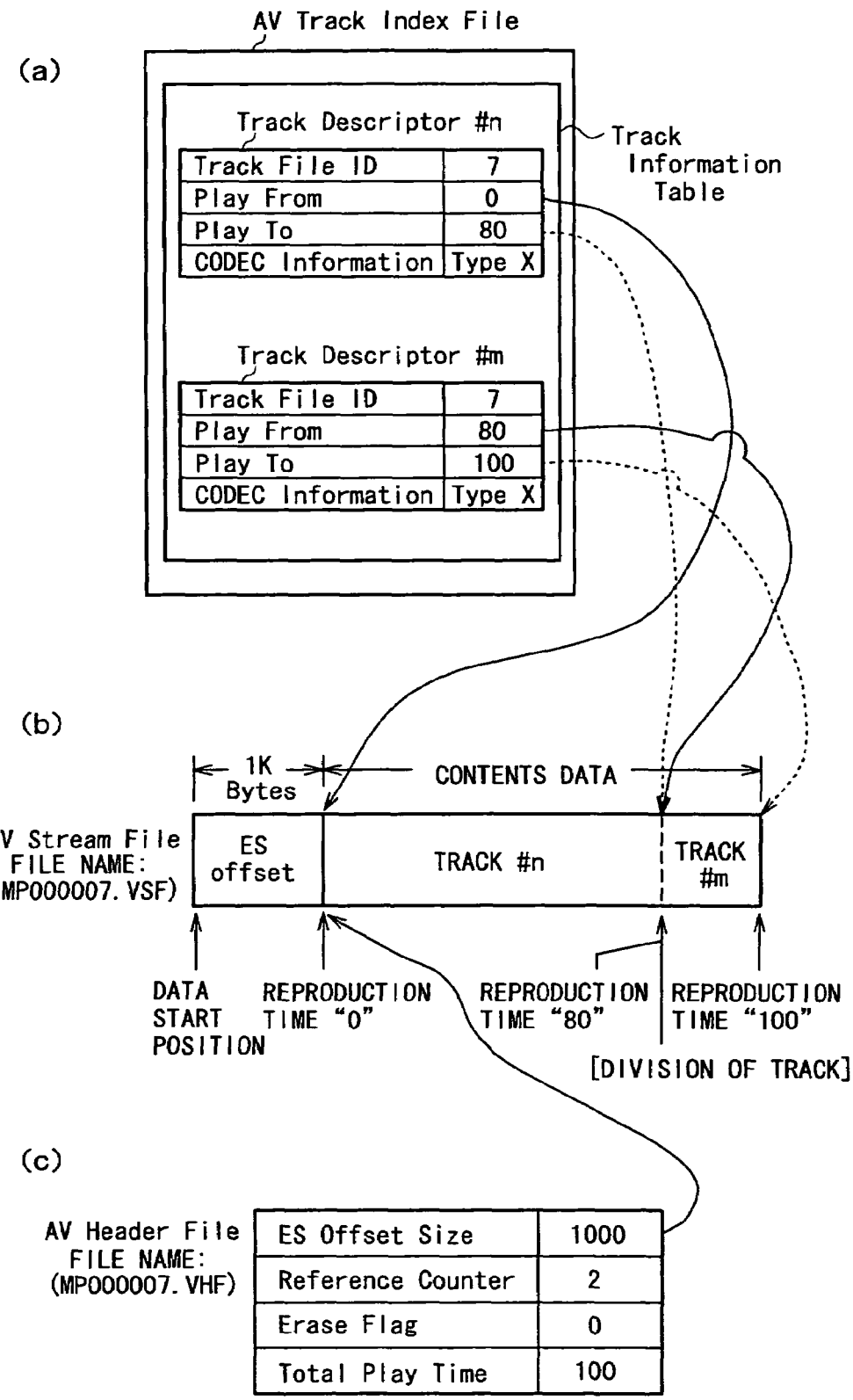
FIG. 11 is a diagrammatic view illustrating an example of track management by the AV Track Index File and the AV Header File corresponding to division editing of a track.

To allow the management to be performed such that the division editing has been performed for the AV Stream File in such a manner as described above, the contents of the AV Track Index File and the AV Header File are altered from those illustrated in (a) and (c) of FIG. 9 to those illustrated in (a) and (c) of FIG. 11, respectively.

First, the AV Header File is altered such that the value of the Reference Counter changes from 1 to 2 as seen in (c) of FIG. 11 so as to indicate that the number of Track Descriptors to be referred to is two (two tracks are included in the AV Stream File). It is to be noted that, since the size of the ES Offset and that the reproduction time of the last end of the contents is "100" are still maintained with regard to the AV Stream File of the file name=MP000007.VSF at this stage, the values of the ES Offset Size and the Total Play Time in the AV Header File do not change. Furthermore, also the value of the Erase Flag remains equal to 0 and does not change at this stage because the contents data of the AV Stream File of the file name=MP000007.VSF do not include an erased track.

If the Track Descriptor having the Track File ID corresponding to the file names of the AV Header File and the AV Stream File is referred to in the AV Track Index File, then Track Descriptors including the Track Descriptors #n and #m exist, for example, as shown in (a) of FIG. 11. This number of the Track Descriptors coincides with the value 2 of the Reference Counter shown in (c) of FIG. 11. In other words, the Track Descriptor #m is added to the Track Descriptor #n in a corresponding relationship to the increase by one track as a result of the track division.

The Track Descriptor #n defines the Track #n by the data part of the reproduction time "0" to "80" of the contents data. In this instance, this is obtained by rewriting necessary information regarding the Track Descriptor #n shown in (a) of FIG. 9 in the following manner.

First, the Track File ID of the Track Descriptor #n indicates 7 similarly as in (a) of FIG. 9. Consequently, it is specified that the Track Descriptor #n describes the track in the AV Stream File of the file name=MP000007.VSF.

Then, since the Play From and the Play To indicate 0 and 80, respectively, it is indicated that the reproduction start time of the data part of the track #n shown in FIG. 11 is "0" and the reproduction end time is "80". Accordingly, the value of the Play To has been rewritten here.

It is to be noted that the CODEC Information is maintained in that it indicates the Type X. However, for example, information regarding the reproduction time and some other information is sometimes changed to corresponding contents for each track as occasion demands.

Further, the Track Descriptor #m produced newly through the division editing defines the Track #m by the data part of the reproduction time "80" to "100" of the contents data.

The Track File ID of the Track Descriptor #m also indicates 7. In other words, it is specified that the Track Descriptor #m also describes a track in the AV Stream File of the file name=MP000007.VSF.

Further, the Play From and the Play To indicate 80 and 100, respectively. Thereby, the Play From and the Play To indicate the reproduction start time and the reproduction end time of the track #m from the base point given by the reproduction start position (reproduction time "0") of the contents data.

In this manner, by setting the contents of the AV Track Index File and the AV Header File to those shown in (a) and (c) of FIG. 11, the AV Stream File of the file name=MP000007.VSF is managed such that the track thereof is divided as seen in (b) of FIG. 11.

Figure 12:
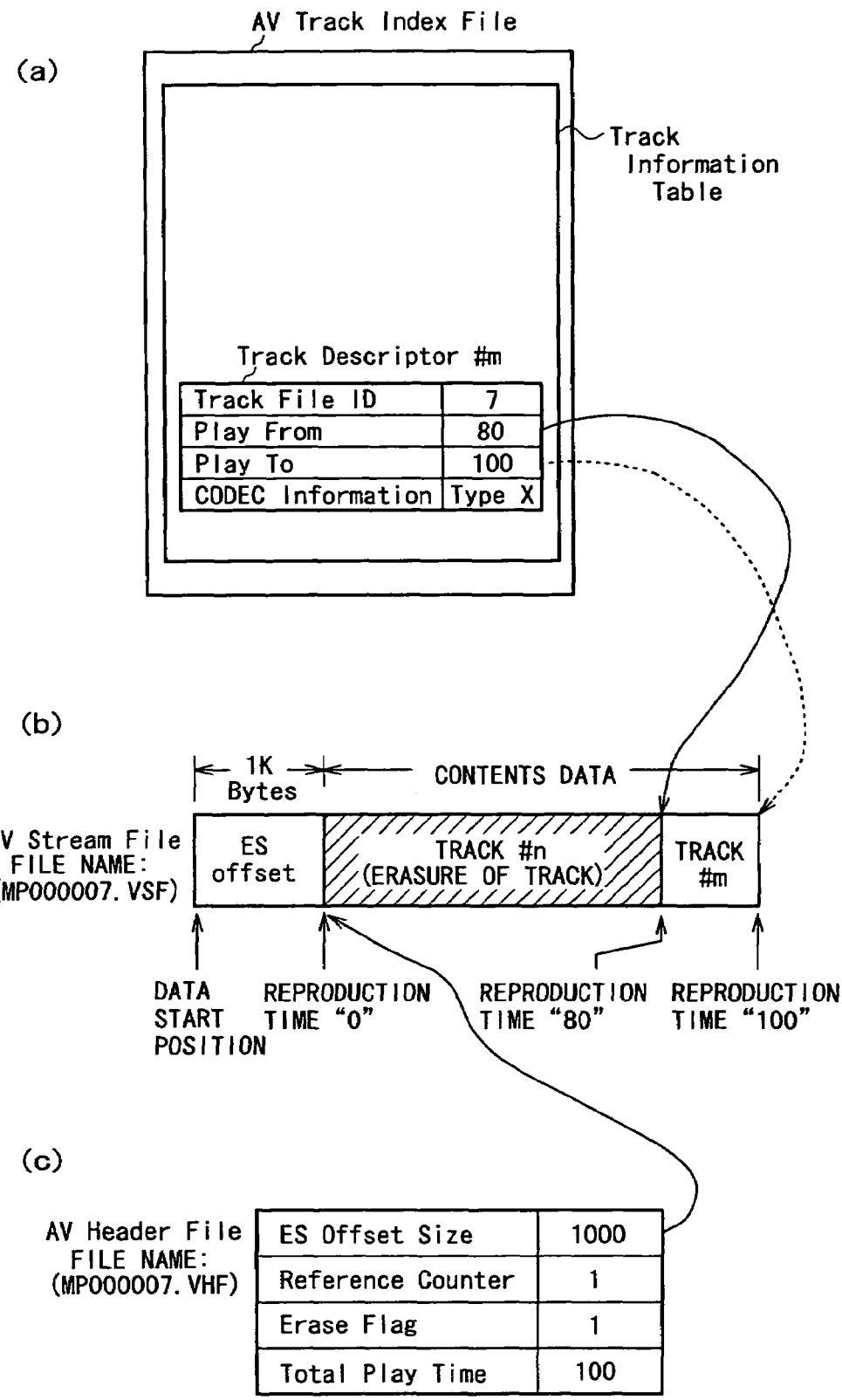
FIG. 12 is a diagrammatic view illustrating an example of track management by the AV Track Index File and the AV Header File corresponding to erasure editing of a track.

Now, another case wherein editing of erasing the track #n regarding the AV Stream File of the file name=MP000007.VSF is performed and the track #m remains as a result of the editing in such a manner as seen in (b) of FIG. 12 is investigated.

It is to be noted for the confirmation, that the erasure here is mere management at all by the AV Track Index File and the AV Header File but does not involve erasure of the data part actually recorded on the disk by the FAT file system. In other words, although the track seems to be erased on the user interface, it is not erased from the disk as far as it is not managed as being erased on the FAT file system.

In the present specification, erasure managed by the AV Track Index File and the AV Header File is referred to as "track erasure", and erasure managed on the FAT file system is referred to as "on-disk erasure".

Thus, to allow a track to be managed as being erased as seen in (b) of FIG. 12, the Track Descriptor of the AV Track Index File is set in such a manner as seen in (a) of FIG. 12.

In particular, in response to the erasure of the track #n, the Track Descriptor #n from among the Track Descriptors corresponding to the AV Stream File of the file name=MP000007.VSF is erased while only the Track Descriptor #m remains present. The contents of the Track Descriptor #m are similar to those of the Track Descriptor #m of (a) of FIG. 11.

Further, in response to the track erasure editing just described, the contents of the AV Header File are updated from those of (c) of FIG. 11 to those of (c) of FIG. 12. In particular, the Reference Counter changes from 2 to 1 and now indicates that the number of Track Descriptors to be referred to (number of tracks in the AV Stream File of the file name=MP000007.VSF) is 1.

At this stage, since the track which has been track-erased remains existing with regard to the AV Stream File of the file name=MP000007.VSF, the Erase Flag should be set. Accordingly, and the value of the flag is rewritten from 0 to 1.

Incidentally, the present embodiment can perform track division editing and track erasure editing in such a manner as described hereinabove with reference to FIGS. 9, 11 and 12. When the convenience to a user is taken into consideration, it is preferable for such an editing process as described above to adopt such a configuration called undo which allows restoration of a state prior to the editing.

In the present embodiment, undo regarding track division and track erasure is possible and can be executed, for example, in the following manner.

First, undo regarding track division is described taking FIGS. 9 and 11 as an example again.

First, where it is presupposed to make undo possible, contents prior to an editing process of the Track Descriptor and the AV Header File corresponding to the AV Stream File of an object of editing are saved into and retained in a predetermined save region, for example, on the RAM 10.

Accordingly, in such a case that editing of track division is performed in such a manner as seen in FIG. 11 from the state of FIG. 9, the contents of the Track Descriptor #n shown in (a) of FIG. 9 and the AV Header File shown in (c) of FIG. 9 are saved into and retained in the save region.

Then, when undo regarding the track division is to be executed, the two Track Descriptors of the Track Descriptors #n and #m shown in (a) of FIG. 11 are deleted from the AV Track Index File first. Then, the Track Descriptor #n shown in (a) of FIG. 9 which has been saved in the save region is placed into the AV Track Index File.

The AV Header File is also rewritten from the contents illustrated in (c) of FIG. 11 to the contents illustrated in (c) of FIG. 9 which have been saved in the save region.

By executing such a process as described above, the AV Track Index File and the AV Header File are altered from the contents illustrated in (a) and (c) of FIG. 11 to the contents illustrated in (a) and (c) of FIG. 9. Thus, the contents data of the AV Stream File of the file name=MP000007.VSF are hereafter managed as a single track. In other words, undo regarding the track division editing has been performed.

If the AV Track Index File and AV Header File of the contents illustrated in (a) and (c) of FIG. 11 are saved into the save region upon undo regarding the track division editing described above, then, it is possible to perform undo from the management state illustrated in FIG. 9 to the management state after the track division illustrated in FIG. 11.

A similar process to that described above may be performed, also where undo is executed so as to restore the state illustrated in FIG. 11 from the state illustrated in FIG. 12 in which the track erasure is performed.

In particular, when track erasure is performed so that the management state illustrated in FIG. 12 is obtained from the management state shown in FIG. 11, the Track Descriptors #n and #m shown in (a) and (c) of FIG. 11 and the AV Header File are saved into the save region.

Then, when undo is to be executed, the Track Descriptor #m shown in (a) of FIG. 12 is deleted from the AV Track Index File. Instead, the Track Descriptors #n and #m shown in (a) of FIG. 11 which have been saved in the save region are placed into the AV Track Index File.

Further, the AV Header File is rewritten from the contents illustrated in (c) of FIG. 12 into the contents illustrated in (c) of FIG. 11 which have been saved in the save region.

As a result, the management of the AV Stream File of the file name=MP000007.VSF by the AV Track Index File and the AV Header File is changed from the contents illustrated in (a) and (c) of FIG. 12 to the contents illustrated in (a) and (c) of FIG. 11. Thus, this indicates that undo regarding the track deletion editing has been performed.

5. On-Disk Erasure

Subsequently, a process of on-disk erasure of deleting a data part of an AV Stream File corresponding to a track on the file system is described.

In the present embodiment, as can be recognized from the foregoing description, an AV Stream File (contents data) undergoes management by the FAT file system and management by the AV Track Index File (Index information) under the FAT file system. What should be noticed here is that, regarding data recorded on the disk, the size of a data management unit by the FAT file system and the size of a data management unit in a case wherein the data are managed as contents data are different from each other. This is described first with reference to FIG. 13.

Figure 13:
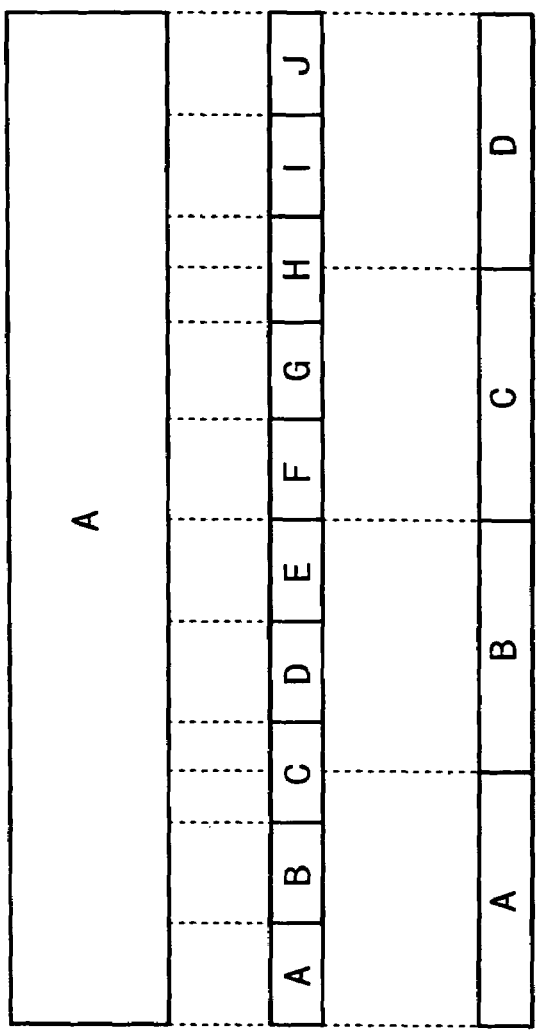
FIG. 13 is a diagrammatic view illustrating an example of a relationship of a data management unit of contents and a data management unit of a file system to the AV Stream File.

FIG. 13 conceptually illustrates a relationship of a data management unit of contents data and a data management unit of a file system to a certain AV Stream File.

First, it is assumed that an AV Stream File in a region A exists as contents data as shown in (a) of FIG. 13. The contents of the AV Stream File are equally divided into 10 data management units A to J as shown in (b) of FIG. 13.

In contrast, it is assumed that the data management unit of the FAT file system divides the AV Stream File equally into four data management units A to D.

It is to be noted that the data management units of the contents shown in (b) of FIG. 13 are index units determined by the specifications of the AV Track Index File. Meanwhile, the data management units of the FAT file system shown in (c) of FIG. 13 are, for example, cluster units.

The description given above in connection with FIG. 13 signifies the following.

First, when track division or track erasure is to be performed for the contents data of the AV Stream File (A) of (a) of FIG. 13, one of the boundary positions between the data management units A to J of the contents shown in (b) of FIG. 13 is determined as a division position or an erasure position.

In contrast, if it is tried to perform on-disk erasure by the management, for example, on the FAT file system, then one of the boundary positions between the data management units A to D of the file system shown in (c) of FIG. 13 is determined as a boundary position for the data part to be erased.

Then, if (b) and (c) of FIG. 13 are compared with each other, then it is apparent that the boundary positions between the data management units of the contents and the boundary positions between the data management units of the file system do not all coincide with each other.

For example, in FIG. 13, the size of the data management units of the file system is set to 2.5 times the size of the data management units of the contents for the convenience of illustration. In this instance, however, although the boundary between the data management units B and C of the file system coincides with the boundary between the data management units E and F of the contents, the boundaries between the data management units A and B and between the data management units C and D of the file system are displaced such that they are included in the data management units C and H of the contents, respectively. Meanwhile, the data management units B, D, G and I of the contents are each included in a block of a data management unit of the file system.

Figure 14:
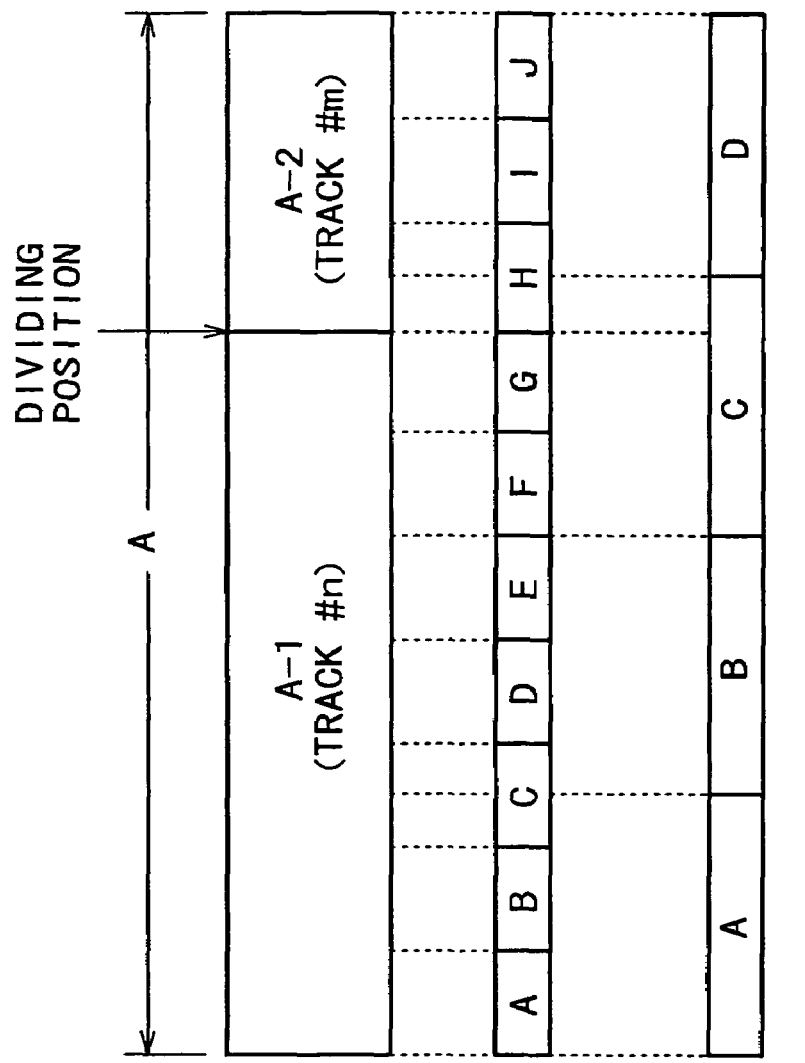
FIG. 14 is a diagrammatic view illustrating an example of a relationship of a data management unit of contents and a data management unit of a file system to a track-divided AV Stream File.

Then, it is assumed that track division editing is performed for the data of the AV Stream File in the region A in the state shown in FIG. 13 such that the data are divided into data parts of regions A-1 and A-2 as seen in (a) of FIG. 14 to produce two tracks #n and #m. In this instance, the track division editing is performed at the boundary position between the data management units G and H of the contents shown in (b) of FIG. 14.

It is to be noted that, for the confirmation, the patterns same as those of (b) and (c) of FIG. 13 are shown in (b) and (c) of FIG. 14, respectively.

A case wherein, after division editing is performed in such a manner as described above with reference to FIG. 14, it is tried to perform on-disk erasure of the track #n corresponding to the region A-1 from the AV Stream File (A) is described with reference to FIG. 15.

Here, it is assumed to try to completely erase, in order to on-disk erase the track #n, the region A-1 in the AV Stream File of the entire region A by rewriting of the FAT. Thus, the boundary between the regions A-1 and A-2 does not coincide with any of the boundaries between the data management units of the file system shown in (c) of FIG. 15 but is included in a block of the data management unit C of the file system.

Accordingly, if it is tried to on-disk erase the region A-1 completely, then the data part of the AV Stream File which corresponds to the three continuous blocks of the data management units A, B and C of the file system is erased. However, the block of the data management unit C of the contents includes a front half of the data management unit H of the contents shown in (b) of FIG. 15. In other words, the data part of the front half of the data management unit H of the contents in the region A-2 of the AV Stream File shown in (a) of FIG. 15 is erased on the disk.

Therefore, when it is tried to on-disk erase the data part corresponding to the track #n, the data part of the AV Stream File which corresponds to the two continuous blocks of the data management units A and B of the file system is erased to avoid erasure of the top portion of the region A-2.

Figure 15:
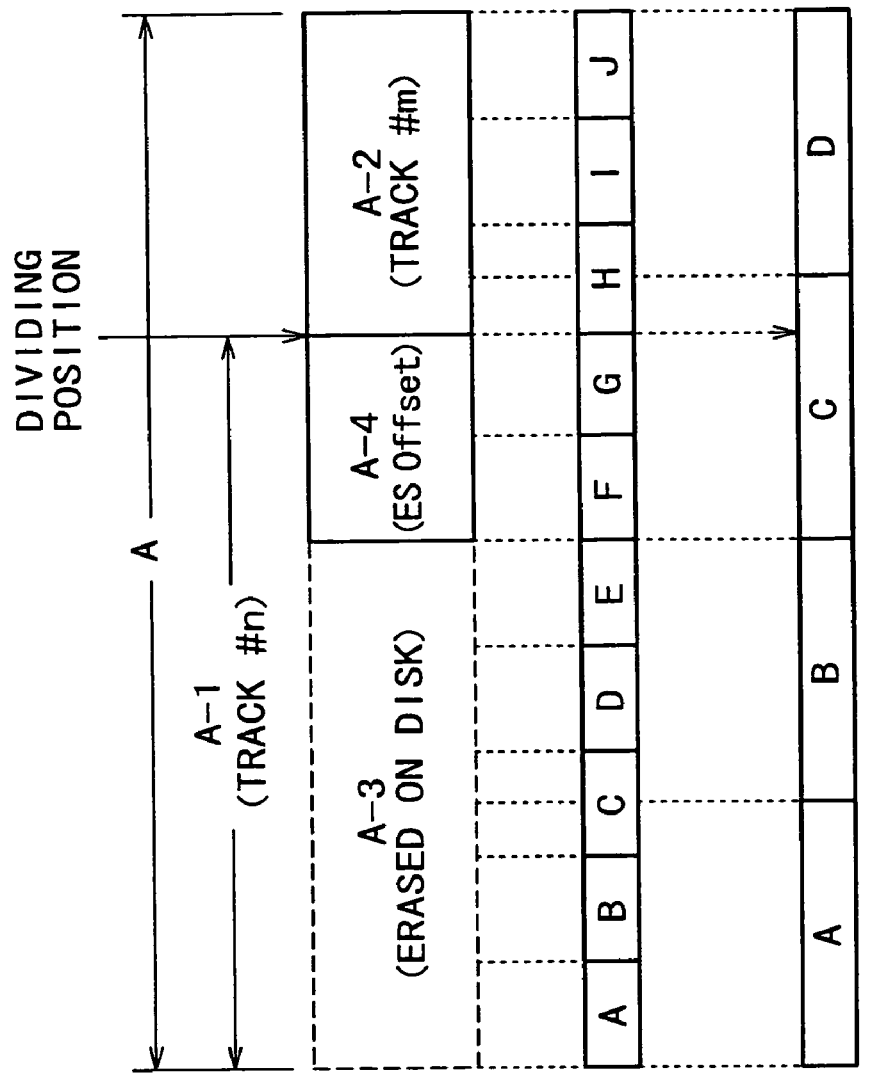
FIG. 15 is a diagrammatic view illustrating an example of setting of an ES Offset upon disk erasure.

Consequently, the region A-3 in (a) of FIG. 15 is erased from the disk by rewriting of the FAT. However, the data part as the region A-4 following the region A-3 remains in the region A-1. This region A-4 is a data portion which begins from the top position of the file system management unit C and ends with the boundary position between the data management units G and H of the contents as seen from FIG. 15.

In this manner, when it is tried to on-disk erase a track formed by track division (or track erasure) based on data management units of the contents, the data part of the track sometimes remains actually at a last end portion thereof without being erased on the disk.

In such an instance as just described, a difference corresponding to the region A-4 appears between the size of the data actually erased on the disk and the size of data which seem to be erased on the disk to the user side. Then, since a data part of such a difference as just described appears and the number of such parts increases every time on-disk erasure is executed, the error between the size of data erased actually on the disk and the size of data which seem to be erased on the disk to the user side successively increases.

Therefore, to eliminate such a disadvantage as just described, in the present embodiment, the region A-4 is treated as an ES Offset added to the top of the succeeding region A-2 as seen in (a) of FIG. 15. Accordingly, as a result of the on-disk erasure illustrated in FIG. 15, a region indicated by the region A-4 (ES Offset)+region A-2 is managed as a region recorded on the disk of the AV Stream File shown in (a) of FIG. 15 on the FAT file system.

According to the foregoing description, in the present embodiment, it is presupposed that data recorded on a disk are managed by the FAT file system. Based on the presupposition, track division and track erasure editing of contents data (AV Stream File) can be performed by rewriting the contents of data files (such as the AV Track Index File, an AV Header File and so forth) managed by the FAT without relying upon rewriting of the FAT.

For example, if it is tried to perform editing of contents data (AV Stream File) relying only on rewriting of the FAT without performing track division or track erasure editing by rewriting of data files (AV Track Index File, AV Header File and so forth), then rewriting of the FAT is performed every time track division or track erasure editing is performed. Since rewriting of the FAT is a process heavier than that where, for example, a data file is operated, the burden on the system increases as much. This gives rise to a disadvantage that, for example, much time is required to end the editing process (to complete the rewriting of the FAT).

In contrast, where editing can be performed by rewriting of data file in such a manner as in the present embodiment, since there is no necessity any more to rewrite the FAT every time editing is performed, the editing process can be executed with a lighter burden, and a rapid editing processing operation can be anticipated.

Here, there is a following meaning in erasure, for example, of a data part of a track by on-disk erasure (rewriting of the FAT) under the circumstance wherein track division or track erasure is performed by rewriting of data files (AV. Track Index File, AV Header File and so forth) as described above.

First, the case wherein data are erased positively by rewriting of the FAT is a case wherein the user arbitrarily deletes unnecessary data. This is intended to record only the necessary data on a disk so that the recording capacity of the disk can be saved as much as possible. This is not limited to the present embodiment but can be applied also where any other rewritable medium is used.

Further, in the present embodiment, the erasure not only relates to saving of the recording capacity described above but also has such a meaning as described below.

In particular, only if track erasure by rewriting of data files (AV Track Index File, AV Header File and so forth) is performed, since the data part erased by the track erasure is managed on the FAT as being recorded on the disk, if track erasure is performed, then a difference between the total data size of the contents as viewed from the user and the total data size of the contents remaining recorded on the disk without being actually erased appears in such a manner that the latter total data size is greater than the former total data size.

Then, as the number of times of track erasure increases, the difference between the total data size (total reproduction time) of all tracks managed by the data file as viewed from the user and the total data size of all contents (AV Stream File) remaining recorded on the disk without being actually erased increases gradually. As the difference increases, for example, the recorded capacity of the disk becomes greater than that estimated by the user, and sometimes, this gives rise to such a disadvantage unfavorable to the user that, at a certain point of time, contents estimated to be recorded sufficiently on the disk cannot be recorded due to shortage of the capacity.

Thus, for example, if a track erased by track erasure is on-disk erased, then such a problem of the difference between the data size on the user side and the data size on the FAT management as described above can be eliminated.

From this, for example, the following automatic on-disk erasure operation can be estimated as an actual application for the recording and reproduction apparatus.

In particular, when the total data size of tracks not erased by the FAT but track-erased as a result of rewriting of the data files becomes greater than a certain level, it signifies that the difference between the total data size of all tracks managed by the data files and the total data size of all contents (AV Stream Files) remaining recorded without being actually erased becomes greater than a fixed level.

Where such a condition as just described is satisfied, on-disk erasure by an amount corresponding to a required data size is executed for an object given by track-erased data parts.

Figure 16:
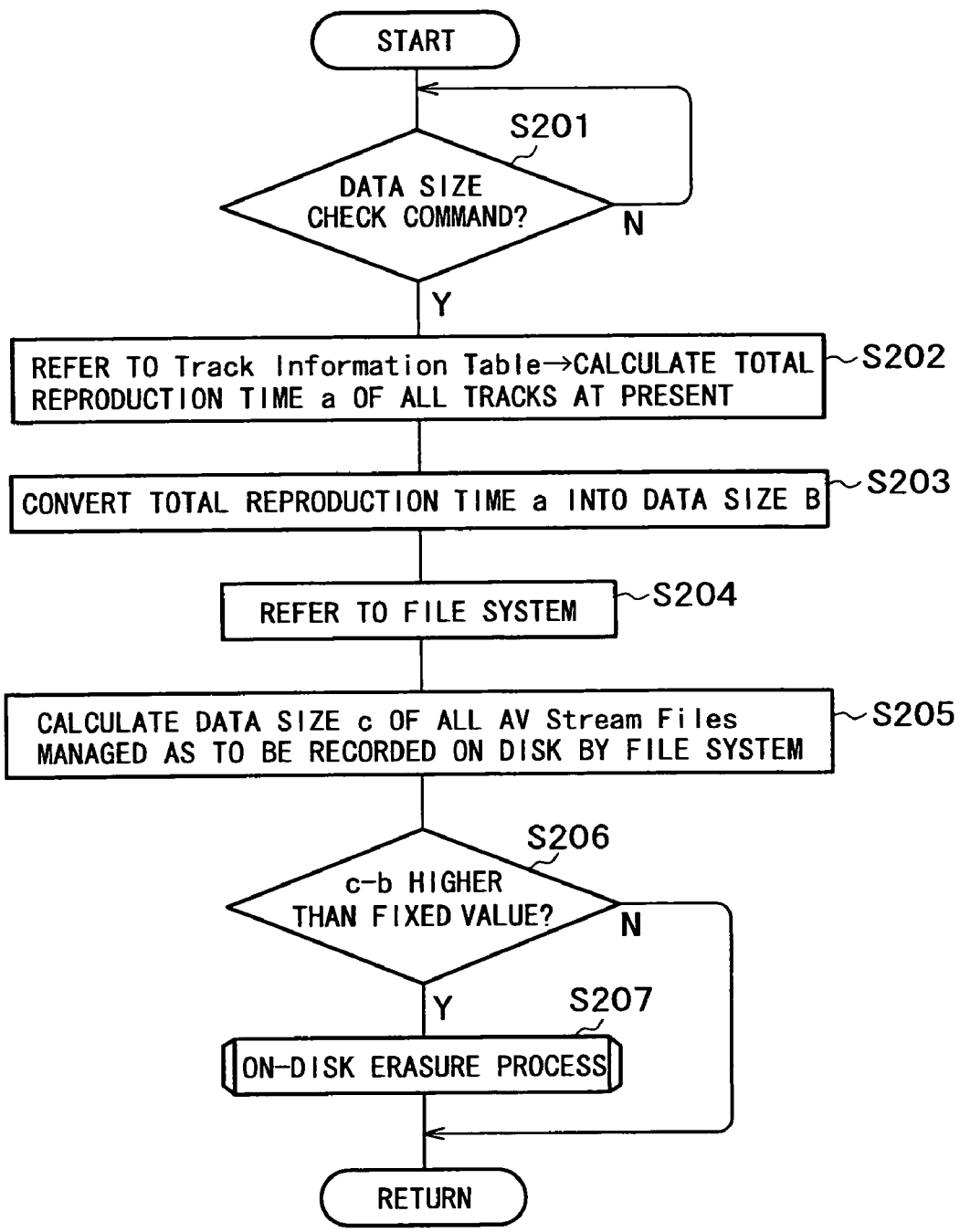
FIG. 16 is a flow chart illustrating a processing operation for starting on-disk erasure.

The flow charts of FIGS. 16 and 17 illustrate a processing operation for such an automatic on-disk erasure operation as described above. It is to be noted that also the process illustrated in the figures is executed by the system controller 8 of the recording and reproduction apparatus 1.

First, the system performs a data size check after every fixed interval of time. The data size check here checks the difference between the total data size of all tracks managed by the data file and the total data size of all contents (AV Stream Files) remaining recorded on the disk without being actually erased as described hereinabove.

Further, the system internally generates a command for the data size check after every fixed interval of time. Thus, as a process at step S201 of FIG. 16, the system controller 8 stands by until a command for the data size check is acquired. Then, after the command is acquired, the processing of the system controller 8 advances to processes at steps S202 et seq.

At step S202, the system controller 8 reads in the Track Information Table in the AV Track Index File. Then, the system controller 8 recognizes a time width indicated by the Play From and the Play To of each of the Track Descriptors stored in the read-in Track Information Table and sums the time widths between the Play From and the Play To. By the summation, a value of the total reproduction time a of reproduction times of all tracks managed by the data files (AV Track Index File and AV Header Files) at present is calculated.

Then, at the next step S203, the value of the total reproduction time a is converted into a value of a size b of the data recorded on the disk in accordance with a predetermined calculation rule.

Then at step S204, reading in of the FAT is executed. Then at next step S205, the system controller 8 calculates, by referring to the read-in FAT, a total data size c of all AV Stream Files managed as being recorded on the disk by the FAT.

Then at next step S206, the system controller 8 discriminates whether or not c-b regarding the value b obtained at step S203 and the value c obtained at step S205 described above is higher than a fixed value set in advance.

Here, if an affirmative result is obtained, then this signifies that the total data size of those tracks which are not erased by the FAT although they are track-erased as a result of rewriting of the data files is greater than a fixed level. Therefore, in this instance, an on-disk erasure process at step S207 is executed. By this on-disk erasure process, erasure of data parts as tracks which are not erased by the FAT although they are track-erased as a result of rewriting of the data files is executed in a unit of a track by an amount corresponding to a necessary data size.

In contrast, if a negative result is obtained at step S206, then the processing is ended immediately, and the system controller 8 stands by through the process at step S201 until the next data size check command is obtained.

The on-disk erasure process at step S207 can be executed, for example, by a procedure illustrated in FIG. 17.

In the on-disk erasure process illustrated in FIG. 17, the system controller 8 first reads in the AV Header Files and searches for those AV Header Files wherein Erase Flag=1 from among the AV Header Files thus read in.

Here, to search for an AV Header File wherein Erase Flag=1 is to specify the file name of the AV Header File. This signifies to specify those AV Stream Files which each includes a data part which is track-erased by the data files but is not erased by the FAT.

In particular, in the present embodiment, it is possible to distinctly recognize, by placing the Erase Flag into the AV Header File, those AV Stream Files which each includes a data part as a track which is track-erased by the data files but is not erased by the FAT, and those AV Stream Files which each includes no such data part.

If it is assumed that the Erase Flag is not placed in the AV Header File, then it is impossible to discriminate whether or not a data part as a track which is track-erased by the data files but is not erased by the FAT exists in the AV Stream File. In other words, even if it is tried to on-disk erase only a data part as a track which is track-erased by the data files but is not erased by the FAT on the AV Stream File, this cannot be executed appropriately as far as it is impossible to discriminate whether or not such a data part exists in the AV Stream File.

Where the Erase Flag is not placed in the AV Header File, the entire AV Stream File cannot be disk-erased, for example, until track erasure by the data files is performed for all tracks which form the AV Stream File and the Reference Counter of the AV Header File has the value 0.

Then at next step S302, the system controller 8 first executes reading in of the Track Information Table. Then, the system controller 8 recognizes a Track Descriptor which stores a Track File ID corresponding to the file name of the AV Header File searched out at step S301 described hereinabove from among the Track Descriptors stored in the Track Information Table.

Then at step S303, the system controller 8 recognizes reproduction time widths of track-erased data parts of the AV Stream Files based on the Track Descriptor recognized at step S302 and contents of the AV Header Files read in at step S301 formerly.

A process for the reproduction time width recognition at step S303 is described with reference to diagrammatic views of FIGS. 18A to 18C.

Figure 18A:
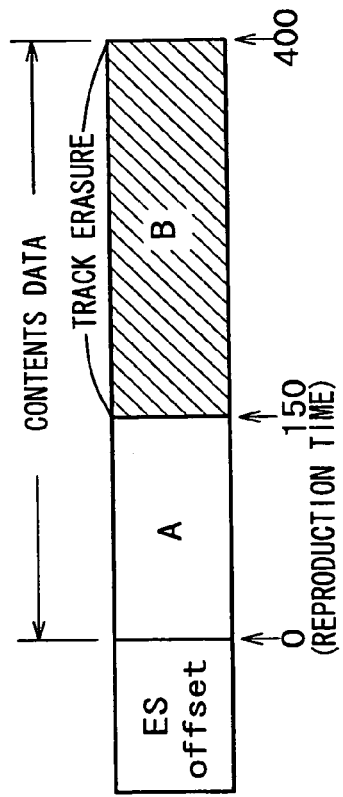
FIGS. 18A to 18C are diagrammatic views illustrating a reproduction time width of a track-erased region in the AV Stream File.
Figure 18B:
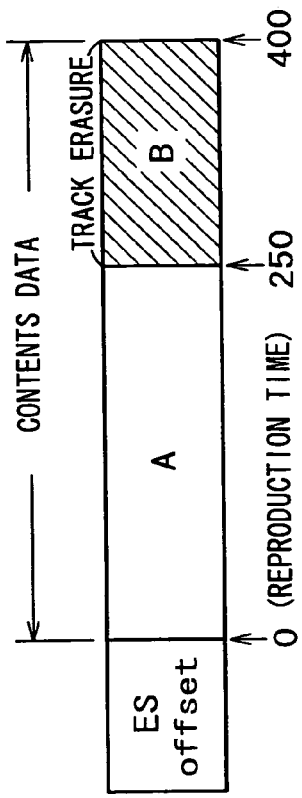
Figure 18C:
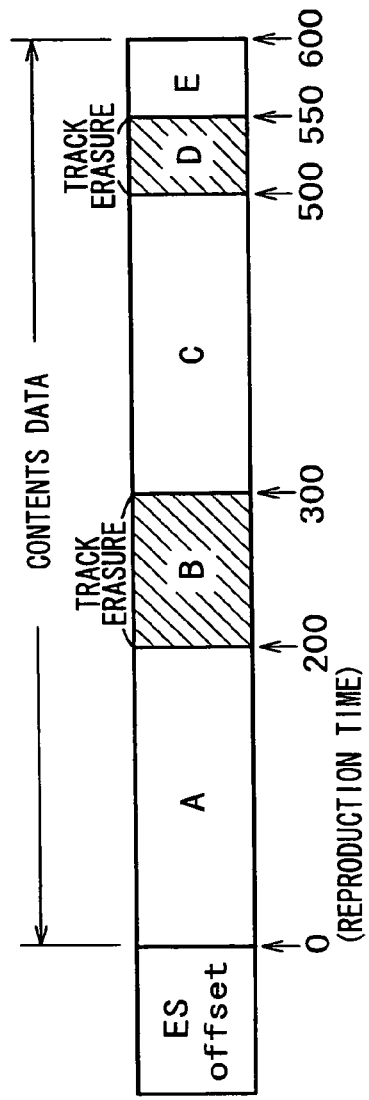

It is assumed here that three AV Stream Files shown in FIGS. 18A to 18C each includes a data part track-erased (and not erased by on-disk erasure (FAT rewriting)).

Further, it is assumed that the Track File IDs corresponding to the AV Stream Files shown in FIGS. 18A to 18C are Track File ID=0, Track File ID=1, and Track File ID=2.

First, in the AV Stream File shown in FIG. 18A, while the reproduction time width of the entire contents data is "400", the data part track-erased is a region whose reproduction time ranges from "150" to "400", and the reproduction time width of the data part is "250".

Meanwhile, in the AV Stream File shown in FIG. 18B, the reproduction time width of the entire contents data is "400" similarly as in FIG. 18A. However, the region B which is a track-erased data part in this instance is a range of the reproduction time from "250" to "400". Therefore, the reproduction time width of the data part is "150".

Further, the reproduction time width of the entire contents data of the AV Stream File shown in FIG. 18C is "600". The track-erased data part in this instance is regions B and D from among regions A to E. The region B is a range of the reproduction time from "200" to "300" and the reproduction time width thereof is "100". The region C is a range of the reproduction time "500" to "550" and the reproduction time width thereof is "50".

Here, for example, in the AV Header File corresponding to the AV Stream File shown in FIG. 18A, the Total Play Time indicates 400. Meanwhile, in the Track Descriptor corresponding to the AV Stream File shown in FIG. 18A, contents for managing the region A as a track are stored, and the Play From and the Play To thereof indicate 0 and 150, respectively.

Then, from the information of the Total Play Time=400, Play From=0 and Play To=150, it can be recognized that the reproduction time width of the region B of the track-erased data part is "250" (=400–150).

Also with regard to the AV Header Files shown in FIGS. 18B and 18C, the reproduction time width of each region which is a track-erased data part can be specified by making use of the values of the Total Play Time of the corresponding AV Header File and the Play From and the Play To stored in the Track Descriptor to be referred to.

Then, after the reproduction time width of each track-erased data part is recognized in such a manner as described above at step S303, the system controller 8 produces a list of the track-erased data parts in order of the reproduction time width at next step S304.

This list is, for example, such as illustrated in FIG. 19. The list shown in FIG. 19 is a list in an example wherein the AV Header Files each including a track-erased data part are such as shown in FIGS. 18A to 18C.

The list shown in FIG. 19 has a structure wherein address-like information for specifying track-erased data parts and information of the reproduction time widths of the track-erased data parts are stored in a listed order. The information stored for specifying a track-erased data part here includes a file ID (Track File ID) of the AV Header File which includes the track-erased data part and the values of the Play From/Play To regarding the track-erased data part.

Here, from among the track-erased data parts of the AV Header Files shown in FIGS. 18A to 18C, the region B of the AV Header File shown in FIG. 18A has the greatest reproduction time width of "250". The second greatest reproduction time width is the reproduction time width "150" of the region B of the AV Header File of FIG. 18B. Further, the reproduction time width of the region B of the AV Header File of FIG. 18C is "100", and the reproduction time width of the region D is "50".

Accordingly, in the list order number 1 shown in FIG. 19, the information regarding the region B of the AV Header File shown in FIG. 18A is stored. In this instance, the information of ID=0 and Play From/Play To=$^{150}/_{400}$ is stored as the information for specifying the track-erased data part. Thus, it is specified that the track-erased data part is the region B of the AV Header File shown in FIG. 18A. Further, as the information of the reproduction time width, 250 is stored.

In the list order numbers 2 to 4 following the list order number 1, information regarding the region B of the AV Header File of FIG. 18B and the regions B and D of the AV Header File of FIG. 18C is stored in the order of the reproduction time width described above.

Then at the next step S305, the system controller 8 refers to the contents of the list produced at step S304 to execute on-disk erasure of the track-erased data parts in accordance with the listed order. In short, the system controller 8 executes on-disk erasure of the track-erased data parts in accordance with the listed order so that a necessary data erasure amount on the disk may be obtained.

Here, the track-erased data parts are successively on-disk erased in accordance with the order of the list produced, for example, in such a manner as shown in FIG. 19. This signifies to successively erase such regions beginning with a region which has the greatest reproduction time width; that is, the region which includes a block of data of the greatest size.

In the recording and reproduction apparatus 1 of the present embodiment, writing of an AV Stream File on a disk is performed such that data thereof are recorded physically continuously as far as possible on the disk. Hence, attention is paid so that they may not be recorded discretely as far as possible.

This arises from the reason that, since the recording medium is a disk, to access discretely recorded data to perform recording or reproduction of stream data imposes a burden on the system from the necessity for access time and seek time.

Taking this into consideration, also where a free capacity is formed on a disk by on-disk erasure of track-erased data parts, it is preferable to form a free capacity which physically continues as long as possible on the disk.

Therefore, in the present embodiment, on-disk erasure is executed for track-erased data parts preferentially beginning with a track-erased data part having the greatest reproduction time width as described above. Consequently, also by on-disk erasure of track-erased data parts, a free capacity which continues as long as possible is obtained.

It is to be noted that, formation of the listed order for on-disk erasure relies upon the reproduction time widths of track-erased data parts at all. Therefore, a data part having a reproduction time width does not necessarily have physical continuity on the disk but may possibly be recoded discretely on the disk.

However, the recording and reproduction apparatus 1 of the present embodiment is configured first such that it executes writing so that one AV Stream File may be recorded in a physically continuous region on a disk as far as possible. Therefore, the effect described above can be achieved in a considerably high probability.

6. On-Disk Erasure of a Block-Encrypted AV Stream File

The recording and reproduction apparatus 1 of the present embodiment includes a cryptography processing section 5*a* in the input and output processing section 5, for example, as shown in FIG. 1. The cryptography processing section 5a executes encryption and decryption processes. In other words, in the present embodiment, data recorded on a disk are sometimes in an encrypted form.

While block encryption is known as one of encryption algorithms, the CBC mode is known as one of modes of the block encryption.

Here, an encryption process according to the CBC mode is described briefly below.

Plaintext data D are divided into blocks d1, d2, . . . , dn of an equal data length.

An IV (Initialization Vector) of a length equal to that of the blocks is prepared.

The exclusive OR of d1 and IV is encrypted, and this is represented by e1.

The exclusive OR of d2 and e1 is encrypted, and this is represented by e2.

The exclusive OR of d3 and e2 is encrypted, and this is represented by e3.

A similar process is successively repeated, and a string of resulting e1, e2, . . . is determined as a cryptography.

Then, an example of a relationship among an AV Stream File, a data management unit of contents, a data management unit of an FAT file system and a block encryption unit in a case wherein the cryptography processing section 5a can execute encryption/decryption processes corresponding to block encryption according to the CBC mode is illustrated in FIG. 20. It is to be noted that the relationship of the units to the AV Stream File is a conceptive relationship for the convenience of description at all and is not necessarily same as an actual relationship.

According to FIG. 20, the AV Stream File shown in (a) of FIG. 20 generally has a region A. Further, the region A of the AV Stream File corresponds, as the data management units of contents of (b) of FIG. 20, to a size for the five management units A to E.

Meanwhile, as regards the data management units of the FAT file system shown in (c) of FIG. 20, the management units A and B and part of the succeeding management unit C correspond to the region A of the AV Stream File. Further, they have a relationship to the data management units of the contents shown in (b) of FIG. 20 that the size of two data management units of the contents is equal to the size of one data management unit of the FAT file system.

Further, the block encryption units shown in (d) of FIG. 20 have a relationship to the data management units of the FAT file system that eight block encryption units have a size equal to that of one data management unit. Accordingly, four block encryption units have a size equal to that of one data management unit of the contents.

Here, it is assumed that track division editing is performed such that the region A of the AV Stream File of (a) of FIG. 20 is divided into a region A-1 and another region A-2 at a dividing position shown in FIG. 20. The dividing position corresponds to the boundary position between the management units B and C of the contents data as seen in (b) of FIG. 20. Further, in this instance, the dividing position coincides also with the boundary between the data management units A and B of the file system shown in (c) of FIG. 20.

Furthermore, the dividing position shown in the figure corresponds also to the boundary between the block encryption units A and B shown in (d) of FIG. 20.

When track division of the AV Stream File is performed in such a manner as described above, it is assumed that the data pat of the AV Stream File which corresponds to the block encryption unit A immediately preceding to the boundary corresponding to the dividing position in the sequence of the block encryption units shown in the figure is a data portion which includes necessary data as an IV (Initialization Vector). It is to be noted that, in this instance, it is assumed that, for example, the entire AV Stream File shown in (a) of FIG. 20 is a chain range of the encryption blocks.

Then, it is further assumed that, after the track division editing is performed in such a manner as described above with reference to FIG. 20, on-disk erasure is performed, for example, for the data part of the region A-1 of the AV Stream File. A state corresponding to a result of such editing is shown in FIG. 21.

As can be seen from this figure, to perform on-disk erasure of the data part of the region A-1 of the AV Stream File is to rewrite the FAT so that the data part of the AV Stream File which corresponds to the data management unit A of the file system may be erased from the disk.

However, if the data part of the AV Stream File corresponding to the data management unit A of the file system is erased from the disk simply by rewriting of the FAT, then also an IV included in the data part of the AV Stream File corresponding to the block encryption unit A is erased.

This IV is information necessary for the encryption and decryption processes of the data part of the succeeding block encryption units. Accordingly, if this IV is simply erased from the disk, then it becomes impossible to appropriately perform encryption and decryption processes for the data part of the AV Stream File in the succeeding region A-2 to reproduce and output the data part.

As one of countermeasures against such a disadvantage of the related art as described above, for example, a data part which includes an IV like the data part of the AV Stream File corresponding to the block encryption unit A is sometimes left on a disk without being erased.

However, as can be seen, for example, also from FIG. 20, if it is attempted to leave the data part of the AV Stream File corresponding to the block encryption unit A including the IV so as not to be erased from the disk, then it cannot be avoided after all to fully leave the data part of the AV Stream File corresponding to the data management unit A of the file system without erasing the same from the disk. Accordingly, in the case of this figure, the data part as the region A-1 of the AV Stream File after all remains without being erased from the disk.

This signifies that, to leave the data part of the block encryption unit including the IV, the data of the data management units, for example, of the file system of a data size greater than that of the data part must be left actually. In short, in this instance, a problem that the disk free capacity cannot be assured efficiently arises.

Further, as another one of the countermeasures, it is sometimes the case to write data of one block encryption unit including an IV like the data part of the AV Stream File corresponding to the block encryption unit A, for example, into a predetermined address region for saving assured on the disk and read out and use, when the IV becomes required, the data from the address region for saving.

In this instance, however, since the region for saving data of the IV must be assured on the disk, a disadvantage that the disk capacity into which user data can be written decreases as much occurs. Further, since the address region for saving and the data of the IV recorded in the address region for saving are managed by the FAT, also the FAT file system is complicated as much, and also the processing becomes heavier.

Therefore, the present embodiment solves the problems described above in such a manner as seen in FIG. 22. It is to be noted that, since (a), (b), (c) and (d) of FIG. 22 are similar to (a), (b), (c) and (d) of FIG. 21, description here is omitted.

(e) of FIG. 22 shows encryption chain units. As can be seen from comparison between the encryption chain units shown in (e) of FIG. 22 and the data management units of the contents shown in (b) of FIG. 22, the encryption chain units and the data management units of the contents are set so as to be same as each other.

Further, regarding this figure, one encryption chain unit corresponds to four block encryption units shown in (d) of FIG. 22.

In short, in the present embodiment, at least one encryption chain unit is placed in the range of one data management unit of the contents. As an example of this, an encryption chain unit and a data management unit of the contents are set same as each other in FIG. 22. Accordingly, for example, two or more encryption chain units may otherwise be placed in the range of one data management unit of the contents. It is to be noted that, in such an instance, all IVs may be a constant (for example, 0).

Where the technique described above with reference to FIG. 22 is adopted, the necessity to leave, upon disk erasure, a data part including an IV by an amount corresponding to a data management unit or units of the file system or to save the IV into a saving region provided on the disk as described above is eliminated, and the problems described above are solved.

It is to be noted that, to implement the technique illustrated in FIG. 22, the cryptography processing section 5a may be configured such that it performs an encryption process for an AV Stream File to be recorded on a disk over a predetermined chain range determined based on the description given above with reference to FIG. 22.

The following can be said regarding the embodiment described above.

First, editing of track division or track erasure of contents data of an AV Stream File is performed by rewriting data files (AV Track Index File, AV Header File and so forth) as described hereinabove with reference to FIGS. 6 to 12. Consequently, since the present embodiment does not rely upon rewriting of the FAT at a stage before editing of track division or track erasure of contents data of an AV Stream File, the processing burden for rewriting of the FAT is moderated, and for example, an editing processing operation which is higher as much can be obtained.

Further, when on-disk erasure is executed for the AV Stream File in such a manner as shown in FIG. 15, if a last end portion of a data region to be on-disk erased remains without being erased, the data part remaining without being erased is added as an ES Offset to the top of the track data part following the data part to form an AV Stream File. Consequently, a difference appearing between the size of data actually erased on the disk and the size of data which seem to be erased on the disk from the user side can be eliminated.

In other words, where track management is performed by data files (AV Track Index File, AV Header File and so forth) under the file management by the file system, a mismatch in such a case as described above is eliminated so that more efficient data management may be performed.

Furthermore, in the present embodiment, an Erase Flag is provided in the AV Header File as described hereinabove with reference to FIG. 17. Then, the state of the Erase Flag is checked to discriminate whether or not a track-erased data part exists in one AV Stream File. In particular, since an Erase Flag is provided, even if a data part which may be on-disk erased is part of an AV Stream File, it is possible to appropriately find out the data part and efficiently produce a free capacity of the disk.

Further, track-erased data parts are on-disk erased in order beginning with the data part having the greatest reproduction time width as described above with reference to FIGS. 17 and 18A to 18C. By doing so, a free capacity which continues as long as possible may be obtained. This makes it possible to produce the free capacity of the disk described above taking the writing/readout efficiency into consideration.

Also by adopting such techniques as described above, more efficient data management is implemented in a case wherein track management is performed by data files (AV Track Index File, AV Header File and so forth) under the file management by the file system.

Furthermore, by defining an encryption chain range in such a manner as described hereinabove with reference to FIG. 22, also when a data part obtained by track division of an AV Stream File encrypted, for example, by the CBC mode or the like is to be erased, there is no necessity to store and save an IV, and reduction of the burden of an FAT rewriting process and so forth and saving of the disk capacity can be anticipated.

In short, also such a technique as described above is performed for more efficient data management where the configuration is adopted to perform track management by data files (AV Track Index File, AV Header File and so forth) under the file management by the file system similarly.

Incidentally, the techniques described above with reference to the figures are implemented, for example, by the system controller 8 executing a program. The program is stored and retained, for example, in the ROM 9 of the recording and reproduction apparatus 1 in advance.

Alternatively, the program may be temporarily or permanently stored (recorded) in or on a removable recording medium such as a flexible disk, a CD-ROM (Compact Disc Read Only Memory), an MO (Magnet Optical) disk, a DVD (Digital Versatile Disc), a magnetic disk and a semiconductor memory. Such removable recording media can be provided as package software.

For example, in the present embodiment, a program can be recorded on the disk 90 and provided as package software. Consequently, the recording and reproduction apparatus 1 can install the program by reproducing the disk 90 to read out the program and storing the program into the ROM 9.

Further, for example, if a program for causing the process of the present embodiment to be executed is stored into various recording media, then the operation of the present embodiment can be executed by installing the program into a personal computer for universal use or the like.

It is to be noted that it is possible not only to install the program from such a removable recording medium as mentioned above but also to download the program from a server in which the program is stored through a network such as LAN (Local Area Network) or the Internet.

The present invention is not limited to the configuration described above. For example, the processing procedures and so forth described hereinabove with reference to the figures may be modified suitably in accordance with actual situations. Further, while an AV Stream File (stream data) of an object of editing in the present embodiment is video data, as described hereinabove, the format of the video data is not particularly limited here. Further, not video data but audio data of various formats including, for example, a compression coded format may be used.

Further, while the recording and reproduction apparatus here is ready for a disk of the mini disk (MD) system, the recording and reproduction apparatus is not limited to this but may have a configuration ready for disk media which can be recorded by other various methods. Furthermore, where a data management structure wherein track management is performed by a data file under the management of a file system is adopted, the present invention may possibly be applied to other media than disk media as an object of application.

As described above, according to the present invention, stream data recorded on a recording medium are managed as a file by a file system. Using this as a presupposition, the stream data are managed in a unit of a track by a track managing data file which is managed by the file system. Then, editing of division or erasure in a unit of a track (track division or track erasure) is executed by rewriting the contents of track management information which defines each track in the track managing data file.

Where such a configuration as described above is adopted, upon a division or erasure editing process in a unit of a track, the necessity to rewrite the file system is eliminated, and the burden of the editing process is moderated as much. Thus, for example, a higher speed editing operation can be achieved.

Further, when stream data are erased from the recording medium based on a data management unit of the file system by rewriting of the file system, if part of a data part of an object of erasure from the recording medium remains in a data region corresponding to a data management unit of the file system, then the remaining part of the data part is added as an offset region to the top of the entity of the stream data. Then, the entity of the offset region plus stream data is managed as a new file of the stream data.

Consequently, a difference appearing between the size of data erased actually on the disk and the size of data which seem to be erased on the disk to the user side is eliminated.

Furthermore, in the present invention, track erasure information (Erase Flag) is defined and the state of the track erasure information is checked to discriminate whether or not a data part for which track erasure editing has been performed exists in one file of stream data so that erasure of the data part can be performed. Consequently, a data portion which is regarded unnecessary although it is part of, for example, a file of stream data can be erased appropriately from the disk to efficiently produce a free capacity of the disk.

Further, an encryption process is executed as follows: a range within which encryption blocks are to be chained may be placed within a range of a minimum data unit (data management unit of contents) for managing stream data in a unit of a track with track management information. By this, also when a data part obtained by track division of a file of encrypted stream data is to be erased, the necessity to store and save information necessary for encryption such as an IV is eliminated. Consequently, the burden of a process for rewriting of the file system and so forth can be reduced and saving of the disk capacity can be anticipated.

In this manner, the present invention first achieves an effect of reduction of the processing burden and other effects by adopting the configuration that track management is performed by a data file under the file management by a file system. Further, where such a configuration as just described above is adopted, more efficient management can be achieved for data to be recorded on a recording medium.

The invention claimed is:

1. A data editing method comprising:
   a first data management step of managing stream data recorded on a predetermined recording medium in a unit of a file based on a file system; and
   a second data management step of performing management in a unit of a track based on a track managing data file which includes track management information formed from information elements each of which is information corresponding to one of tracks each of which is a data part within a range of the stream data in the file unit and indicates coordination with the stream data of the file unit and information elements each of which indicates a data position of one of the tracks in the stream data of the corresponding file unit;
   wherein said second data management step executes, where track division of dividing the stream data of the file unit to form a plurality of tracks or track erasure of erasing one of the tracks is to be performed, an updating process for contents of the track management information in the track managing data file in response to a manner of the track division or track erasure;
   and wherein said first data management step manages data such that an offset region is provided at the beginning of the stream data as one file and the entity of the stream data is disposed following the offset region; and
   when on-medium erasure of erasing a data part of a track unit of the stream data from the recording medium by rewriting of the file system is performed, if partial data of the data part of the track unit which is the object of the on-medium erasure remains in the data part for the data management unit of the file system including a last end position of the data part of the track unit which is an object of the on-medium erasure, manages the remaining partial data as the offset region.

2. The data editing method according to claim 1, wherein said first data management step produces and retains track erasure information indicative of whether or not erasure by the track-erasure has been performed for at least one of data parts as tracks which form the stream data as one file, and said first data editing method further comprises:
   a discrimination step of discriminating the stream data having track-erasable data parts by referring to the track erasure information; and
   a control step of determining a data part as a track to be erased based on a result of the discrimination at the stream data discrimination step and controlling said first data management step so that the determined data part as a track is track-erased.

3. The data editing method according to claim 1, further comprising an encryption processing step of chaining at least encryption blocks of data to be recorded on the recording medium and encrypting the chained encryption blocks,
   wherein said encryption processing step executes an encryption process such that the encryption blocks are chained within a range of a minimum data unit for managing the stream data in the track unit by the track management information.

4. A data editing apparatus comprising:
   first data management means for managing stream data recorded on a predetermined recording medium in a unit of a file based on a file system; and
   second data management means for performing management in a unit of a track based on a track managing data file which includes track management information formed from information elements each of which is information corresponding to one of tracks each of which is a data part within a range of the stream data in the file unit and indicates coordination with the stream data of the file unit and information elements each of which indicates a data position of one of the tracks in the stream data of the corresponding file unit;

wherein said second data management means executes, where track division of dividing the stream data of the file unit to form a plurality of tracks or track erasure of erasing one of the tracks is to be performed, an updating process for contents of the track management information in the track managing data file in response to a manner of the track division or track erasure;

and wherein said first data management means manages data such that an offset region is provided at the top of the stream data as one file and the entity of the stream data is disposed following the offset region; and when on-medium erasure of erasing a data part of a track unit of the stream data from the recording medium by rewriting of the file system is performed, if partial data of the data part of the track unit which is the object of the on-medium erasure remains in the data part for the data management unit of the file system including a last end position of the data part of the track unit which is an object of the on-medium erasure, manages the remaining partial data as the offset region.

5. The data editing apparatus according to claim 4, wherein said first data management means produces and retains track erasure information indicative of whether or not erasure by the track-erasure has been performed for at least one of data parts as tracks which form the stream data as one file, and said data editing apparatus further comprises:

discrimination means for discriminating the stream data having track-erasable data parts by referring to the track erasure information; and control means for determining a data part as a track to be erased based on a result of the discrimination by said stream data discrimination means and controlling said first data management means so that the determined data part as a track is track-erased.

6. The data editing apparatus according to claim 4, further comprising encryption processing means for chaining at least encryption blocks of data to be recorded on the recording medium and encrypting the chained encryption blocks, wherein said encryption processing means executes an encryption process such that the encryption blocks are chained within a range of a minimum data unit for managing the stream data in the track unit by the track management information.

* * * * *